(12) United States Patent
Halleck et al.

(10) Patent No.: US 10,025,746 B2
(45) Date of Patent: Jul. 17, 2018

(54) HIGH PERFORMANCE INTERCONNECT

(71) Applicant: Intel Corporation, Santa Clara, CA (US)

(72) Inventors: William R. Halleck, Lancaster, MA (US); Rahul Shah, Marlborough, MA (US); Venkatraman Iyer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 14/578,395

(22) Filed: Dec. 20, 2014

(65) Prior Publication Data

US 2016/0179740 A1    Jun. 23, 2016

(51) Int. Cl.
*G06F 13/42*    (2006.01)
*G06F 13/22*    (2006.01)

(52) U.S. Cl.
CPC .......... *G06F 13/4221* (2013.01); *G06F 13/22* (2013.01)

(58) Field of Classification Search
CPC ........................... G06F 13/22; G06F 13/4221
See application file for complete search history.

(56) References Cited

U.S. PATENT DOCUMENTS

| | | | |
|---|---|---|---|
| 2010/0306437 A1* | 12/2010 | Heath ................. | G06F 13/4027 710/305 |
| 2011/0243211 A1* | 10/2011 | Chacko ............ | G01R 31/31928 375/228 |
| 2014/0112339 A1* | 4/2014 | Safranek ............. | G06F 12/0831 370/389 |
| 2014/0115374 A1* | 4/2014 | Iyer ........................ | G06F 1/12 713/400 |
| 2015/0185809 A1* | 7/2015 | Bharadwaj ............ | G06F 1/3253 713/323 |

\* cited by examiner

*Primary Examiner* — Nimesh G Patel
(74) *Attorney, Agent, or Firm* — Alliance IP, LLC

(57) ABSTRACT

A signal is received, a boundary of which is to be sent in alignment with a sync counter value. A nominal latency of a link is determined based on the sync counter value. Additional latency is applied to the signal to increase the nominal latency to a target latency for the link.

14 Claims, 14 Drawing Sheets

DETECT ⟵ 805

| EIEOS | TS 0 | TS 1 | TS 2 | TS 3 | · · · · · | TS 6 | ~1KUI |

POLLING/CONFIG/LOOPBACK ⟵ 810

| EIEOS | TS 0 | TS 1 | TS 2 | TS 3 | · · · · · | TS 30 | ~4KUI |

PARTIAL WIDTH TRANSMITTING STATE EXIT ⟵ 815

| EIEOS | | | | | | | |
| EIEOS | FTS 0 | FTS 1 | FTS 2 | FTS 3 | · · · · · | FTS 6 | ~1KUI |
| EIEOS | FTS | FTS | · · · · · | SDS | FTSp | | |

COMPLIANCE ⟵ 820

| EIEOS | CS | ~4KUI |

FIG. 8

HIGH PERFORMANCE INTERCONNECT

FIELD

The present disclosure relates in general to the field of computer communications, and more specifically, to an input/output hardware architecture.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 8 illustrates example control supersequences.

Like reference numbers and designations in the various drawings indicate like elements.

DETAILED DESCRIPTION

Figure 1:
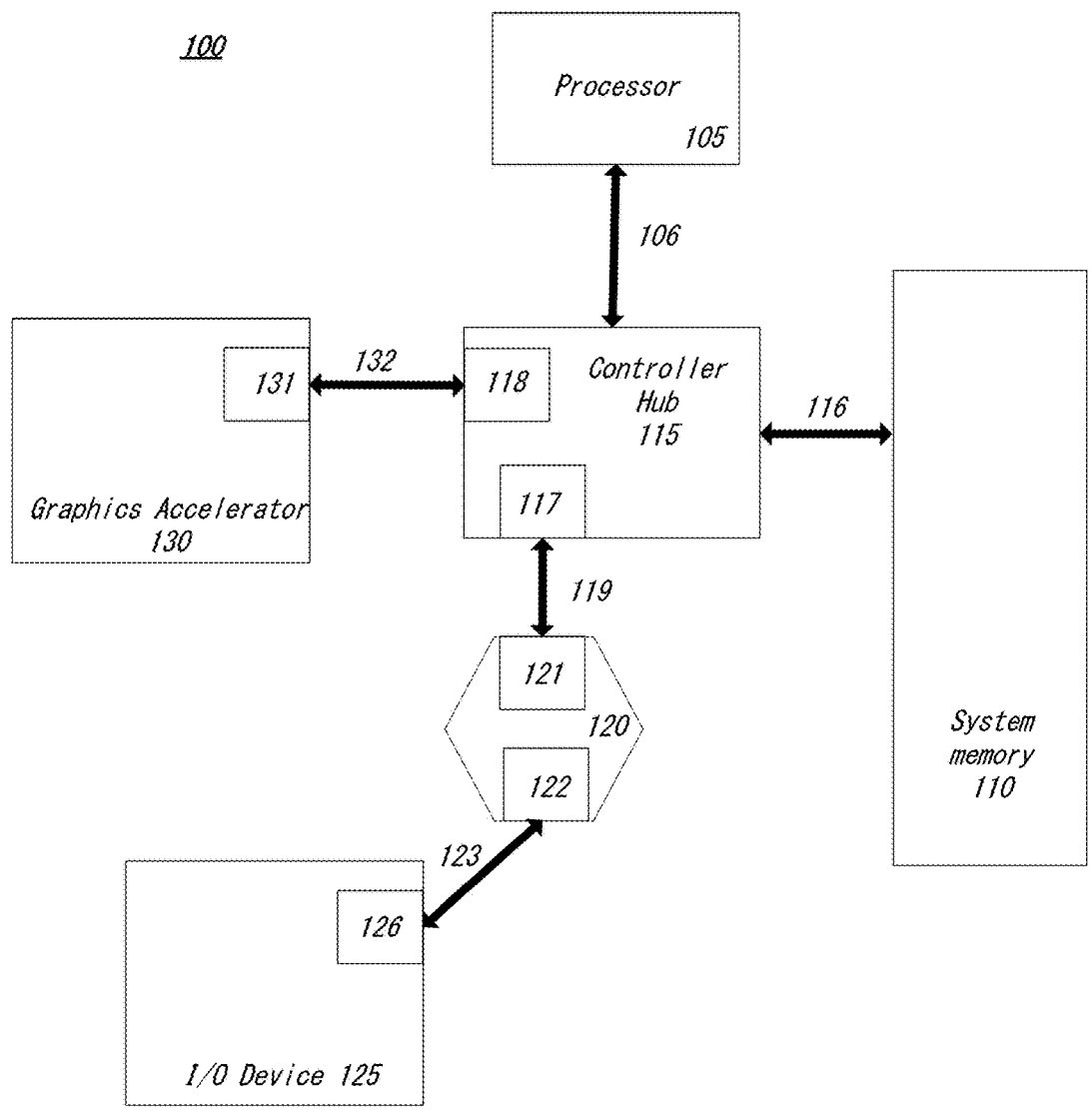
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
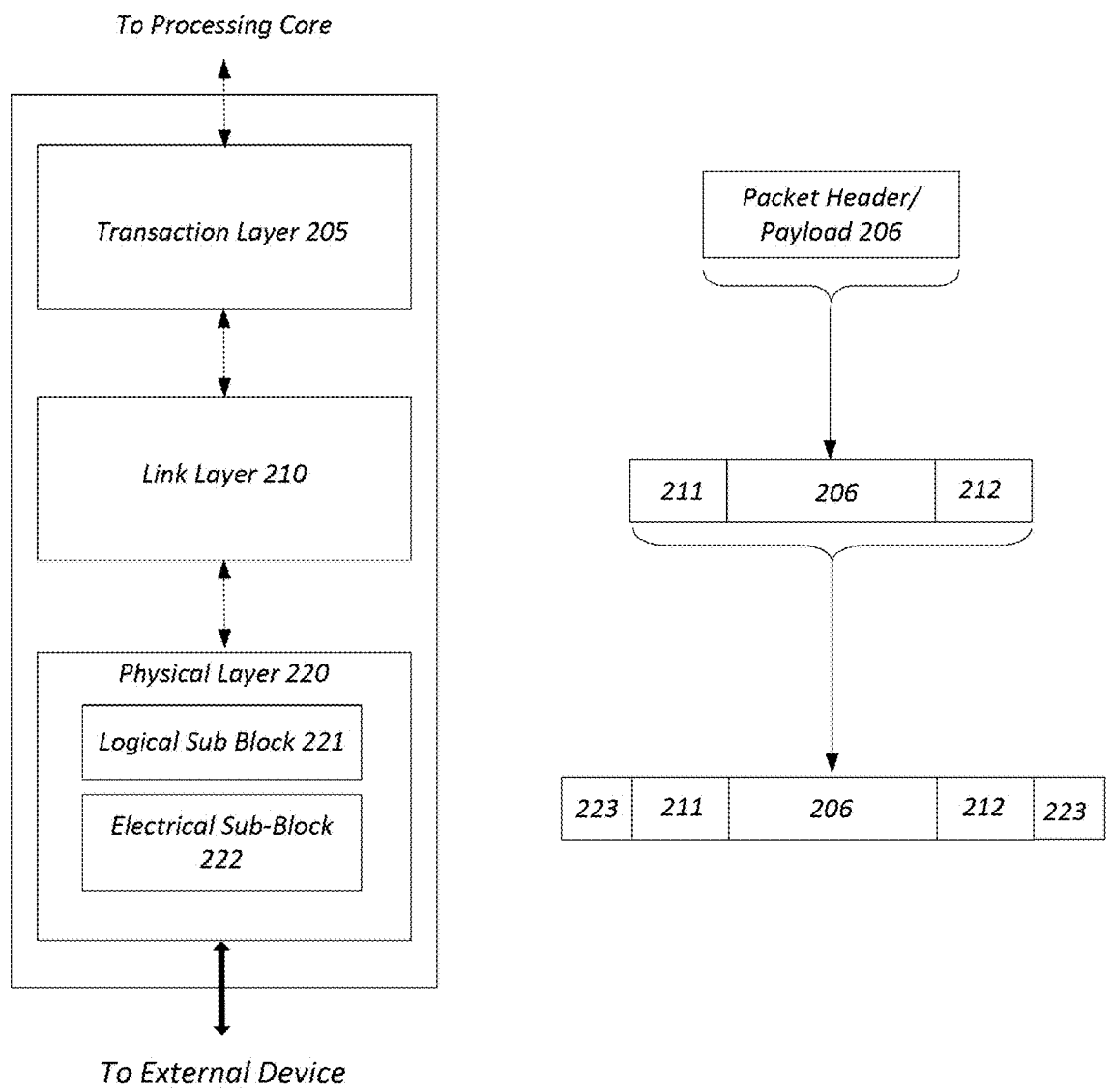
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figures 3, 4:
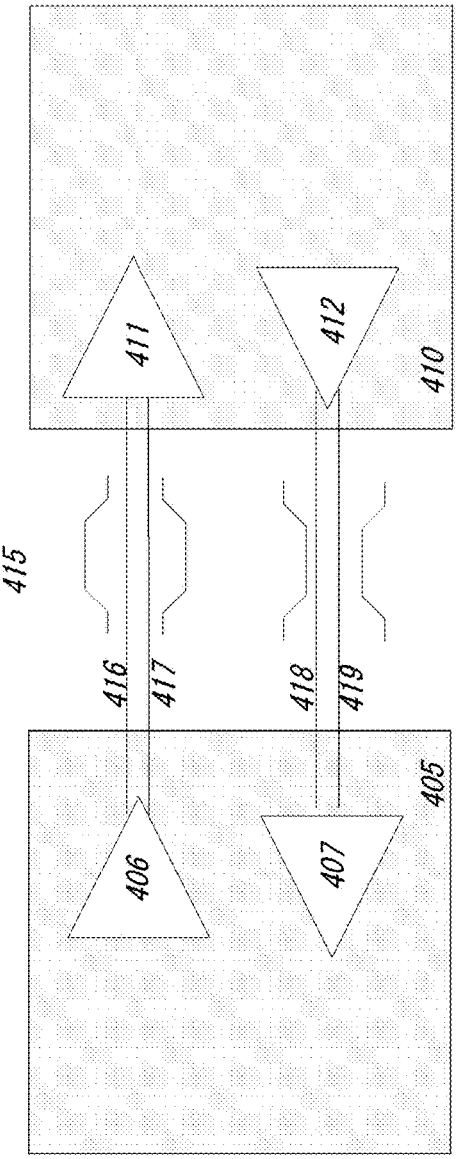
FIG. 3 illustrates an embodiment of a transaction descriptor.
FIG. 4 illustrates an embodiment of a serial point-to-point link.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
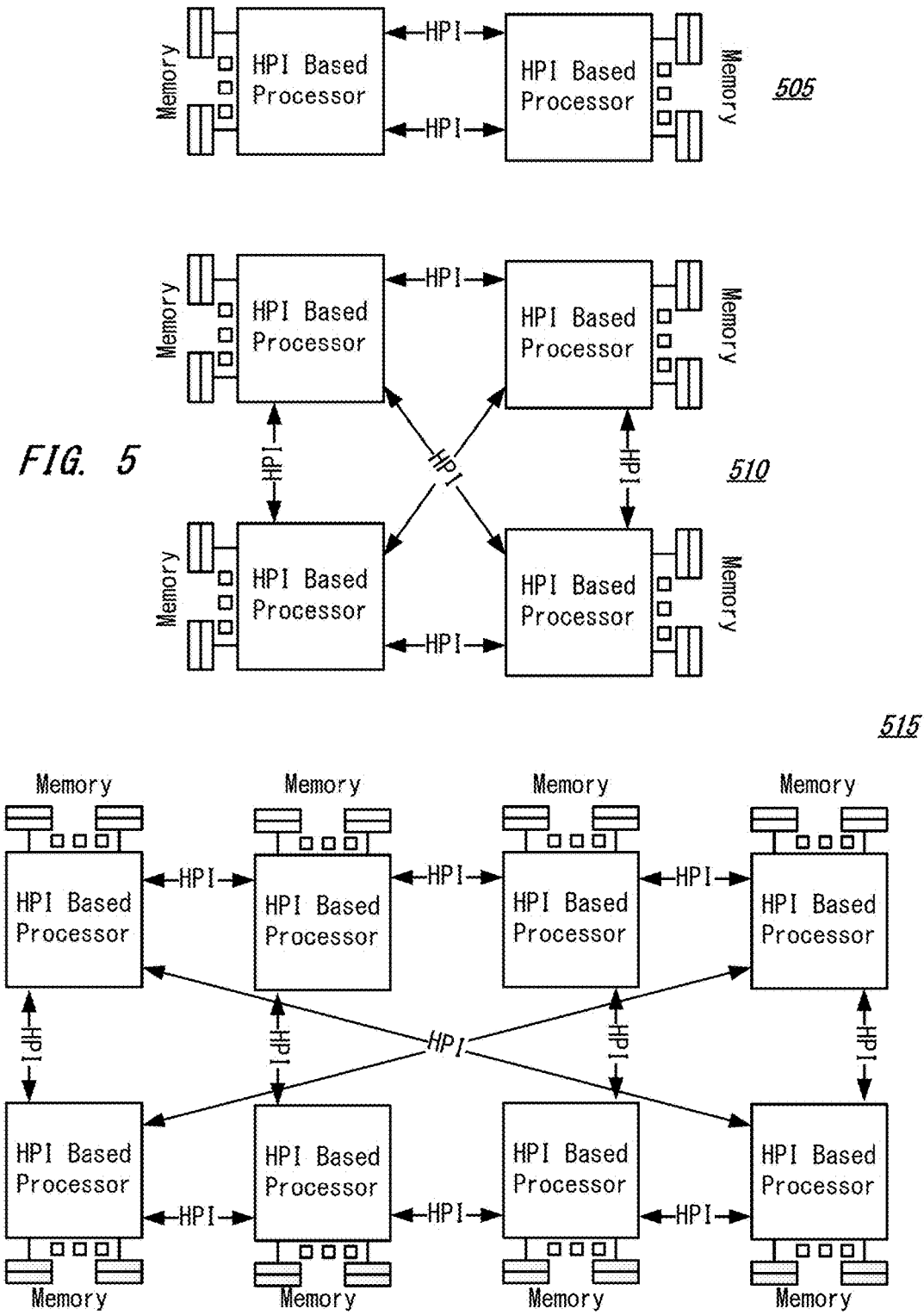
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
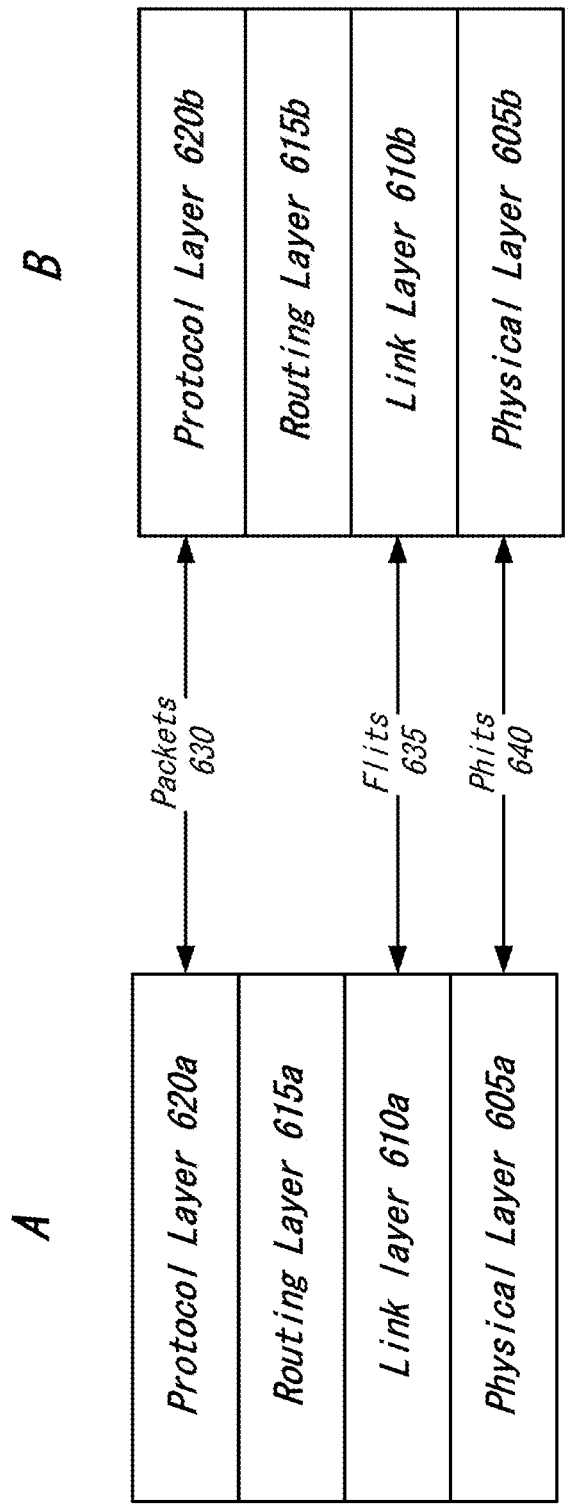
FIG. 6 illustrates an embodiment of a layered protocol stack associated with HPI.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

Physical Layer

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
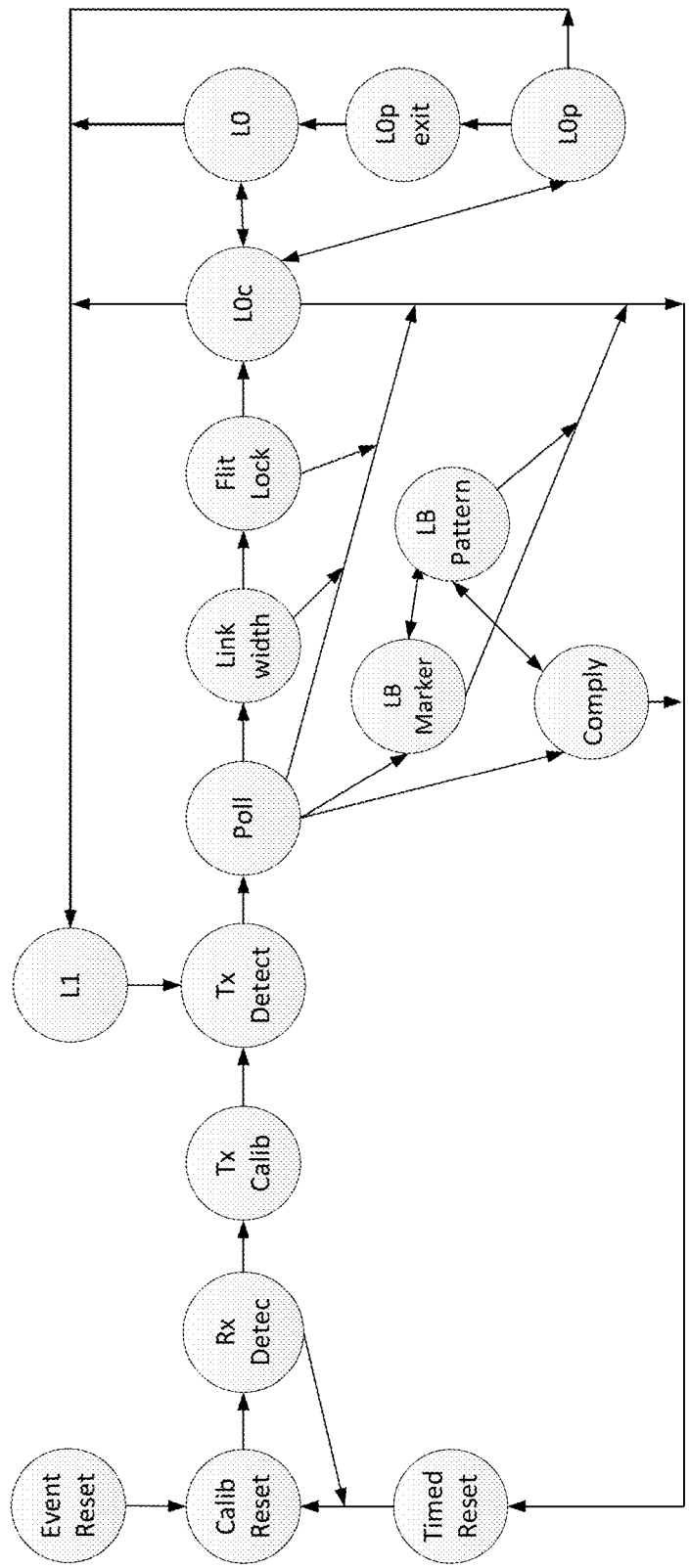
FIG. 7 illustrates a representation of an example state machine.

FIG. 7 illustrates a representation of at least a portion of a state machine used by agents in one example implementation of HPI. It should be appreciated that the states included in the state table of FIG. 7 include a non-exhaustive listing of possible states. For instance, some transitions are omitted to simplify the diagram. Also, some states may be combined, split, or omitted, while others might be added. Such states can include:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an electric idle exit ordered set (or EIEIOS). May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, locks on bits (e.g., by initializing a drift buffer), locks on bytes (e.g., by identifying symbol boundaries), and locks on training sequence boundaries (e.g., by locking to an electrical ordered set (EOS) and/or a training sequence header). Lanes may then be deskewed. Handshakes can also be completed to exit polling to one of several potential states. For instance, an exit can be caused (by an agent) to any one of a Link Width state, Compliance state, Loopback Marker state, or Reset state. Handshaking can include the completion of various defined receiver actions or conditions and the sending of an acknowledge message (ACK) to trigger the exit to the state corresponding to the completed set of actions and the ACK. For polling deskew, lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may also include latency fixing in some implementations. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Compliance state: entered from the Polling state. An agent may be made a Compliance master or slave for validation purposes. The device (acting as master) can send a compliance pattern to another device (slave) and the slave can loop back the pattern after re-timing it to its local clock (e.g., without undo of any polarity inversion or lane reversal). The compliance pattern can be used to characterize operation of the analog front end on some subset of lanes when Loopback is not functional or undesired. For instance, entering Loopback can be preconditioned on successful byte lock, TS lock, deskew, latency testing, and other testing reliant on the proper functioning of several piece of digital logic. With bit lock accomplished, Compliance can be entered and may be utilized for jitter or noise investigation, debug, exploring a link, among other conditioning. In other words, Compliance can serve as an alternative exit for Polling in the event the results of Polling do not allow direct entry into Loopback. The Compliance state can drive a supersequence with a transmitter from the master. Receiver looks for a wake on a monitor lane, debounces the wake, drops bad lanes, adapts, and bit locks, etc. The slave transmitter can drive the compliance pattern until its receiver actions are complete. Then loop-back is re-timed and non-deskewed. Slave receiver does similar monitor and debounce, etc. actions. Exit may be to a reset state, such as a timed reset, or to a Loopback Pattern state to start the test, among other examples. In the case of an exit to Loopback Pattern state, the master may be sent (e.g., by a software controller) to the Loopback Pattern state to try out more specialized patterns.

Agent Loopback Marker State: Loopback marker is an agent state but unlike other agent states master and slave actions and exits may be different. Loopback slave may undo any polarity inversion and/or lane reversal but may not descramble or rescramble looped back bits. Acknowledgment exchange may not apply to slave since it is looping back. Since slave may deskew before looping back on symbol boundary, master may not be forced to re-bytelock or re-deskew but the master may re-lock training sequence to avoid locking to some alias. Means to do this may include re-seeding of LFSR, comparing TS and/or EIEOS or some combination of these. The end of the SDS marks the end of loopback setup and the start of pattern generation, checking and counting.

Agent Loopback Pattern State (or Block Link state): Entered from either a Loopback Marker state or Compliance state. In Loopback Pattern state, instead of control patterns, a master transmitter can send additional specialized patterns to supplement those looped-back in a Compliance or Loopback Pattern state. For instance, various additional or alternative patterns can be utilized to condition the link, such as lane specific compliance patterns, longer patterns (e.g., longer than a 4K UI PRBS pattern), among other examples. As another, more specific example, an Interconnect Built-In Self Test (IBIST) pattern can be sent. The receiver can receive specialized patterns in Loopback Pattern and check for errors in the received pattern. For transmitter adaptation both agents can be masters. For a predetermined period, the transmitter can sends a pattern and a remote receiver can compare this pattern and determine a figure of merit or metric for the received pattern which is recorded in a storage element, such as a register. The comparison method and metric may be design dependent (e.g., BER with jitter injection). At the end of the period, both agents can exit to Reset for the backchannel to examine the metric and set up the next iteration of transmitter adaptation.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, first state to initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot) when both transmitter and receiver have exited to a blocking link state or other link state. Transmitter exit to a link state, in one embodiment, includes start of a data sequence (SDS) and training sequence (TS) boundary after receiving a planetary alignment signal. Here, receiver exit may be based on receiving an SDS from a remote transmitter. This state may be a bridge from agent to link state. Receiver identifies SDS. Receiver may exit to blocking link state (BLS) (or a control window) if SDS received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. May be entered from a blocking link state and return to a blocking link state on an event, such as a timeout.

Transmitter transmits flits. Receiver receives flits. May also exit to a low power link state. In some implementations, transmitting link state (TLS) can be referred to as the L0 state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, periodically occurs. The period is referred to as a BLS interval and may be timed, as well as may differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or L0c, state.

Figure 9:
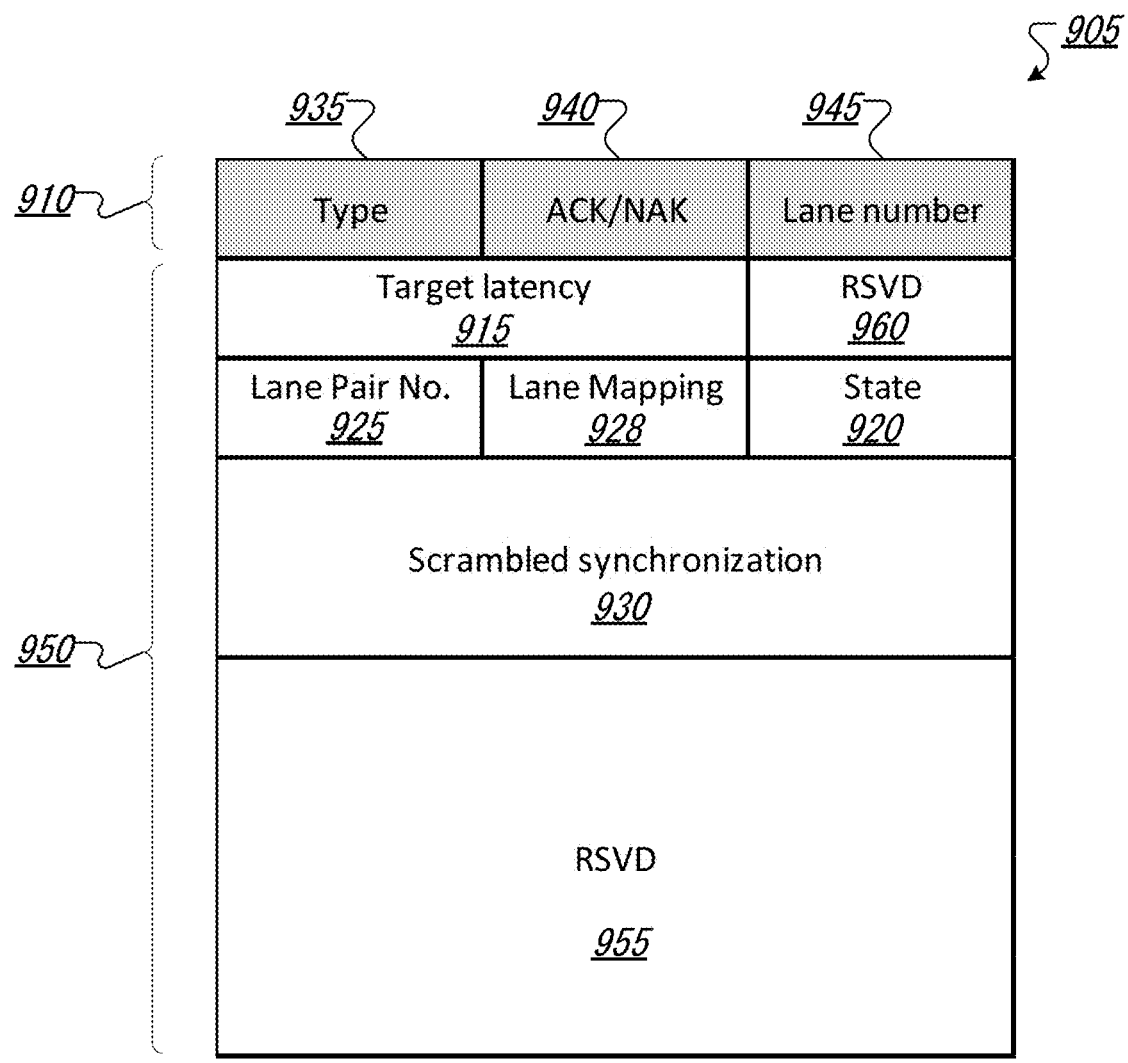
FIG. 9 illustrates an example training sequence.

Partial Width Transmitting Link State: Link state. May save power by entering a partial width state. In one embodiment asymmetric partial width refers to each direction of a two direction link having different widths, which may be supported in some designs. An example of an initiator, such as a transmitter, sending a partial width indication to enter partial width transmitting link state is shown in the example of FIG. 9. Here, a partial width indication is sent while transmitting on a link with a first width to transition the link to transmit at a second, new width. A mismatch may result in a reset. Note that speeds may not be altered but width may be. Therefore, flits are potentially sent at different widths. May be similar to a transmitting link state logically; yet, since there is a smaller width, it may take longer to transmit flits. May exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation) as shown in the timing diagram. Here, non-retry-able flits, such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern start with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In some implementations, state transitions can be facilitated to allow states to be bypassed, for instance, when state actions of the states, such as certain calibrations and configurations, have already been completed. Previous state results and configurations of a link can be stored and reused in subsequent initializations and configurations of a link. Rather than repeating such configurations and state actions, corresponding states can be bypassed. Traditional systems implementing state bypasses, however, often implement complex designs and expensive validation escapes. Rather than using a traditional bypass, in one example, HPI can utilize short timers in certain states, such as where the state actions do not need to be repeated. This can potentially allow for more uniform and synchronized state machine transitions among other potential advantages.

In one example, a software-based controller (e.g., through an external control point for the Physical layer) can enable a short timer for one or more particular states. For instance, for a state for which actions have already been performed and stored, the state can be short-timed to facilitate a quick exit from the state to a next state. If, however, the previous state action fails or cannot be applied within the short timer duration, a state exit can be performed. Further, the controller can disable the short timer, for instance, when the state actions should be performed anew. A long, or default, timer can be set for each respective state. If configuration actions at the state cannot be completed within the long timer, a state exit can occur. The long timer can be set to a reasonable duration so as to allow completion of the state actions. The short timer, in contrast, may be considerably shorter making it, in some cases, impossible to perform the state actions without reference back to previously-performed state actions, among other examples.

In some instances, during initialization (or re-initialization) of a link, as agents progress through a state machine toward an operational link state, one or more failures or state exits can occur that cause the state to reset (e.g., to a reset or other state). In effect, the initialization of the link can loop through one or more states without completing the initialization and entering a link state. In one example, a count can be maintained for the number of unproductive loops in state transitions within the initialization of a link. For instance, each time an initialization returns to a reset state without reaching a link state a counter can be incremented. The counter can be reset for the link once the link successfully enters a link state. Such counters can be maintained by agents on both sides of the link. Further, a threshold can be set, for instance, by a software-based controller utilizing one or more external control points. When the count of unproductive loops meets (or exceeds) the defined threshold initialization of the link can be suspended (e.g., set and held at or before the reset state). In some implementations, in order to recommence initialization and release the initialization from the suspended state, a software-based controller can trigger a restart or re-initialization of the link. In some instances, the software-based tools can analyze the nature of the suspended initialize and perform diagnostics, set register values, and perform other operations so as to guard against further looping of the initialization. Indeed, in some implementations, a controller can set a higher counter threshold or even override the counter, among other examples, in connection with restarting a suspended link initialization.

In some implementations of HPI, supersequences can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an EIEIOS. In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

In some implementations of an interconnect, such as in QPI, terminations of a serial data link can be brought on and off, such as when a link is reset or initialized. This approach can introduce complexity and time into the initialization of a link. In some implementations of HPI, terminations of the link can be maintained including during a reset or re-initialization of the link. Further, HPI can permit hot-plugging of devices. When another device is introduced, either through hot-plugging or otherwise, the voltage characteristics of the lane on which the new remote agent is added will change. The local agent can sense these changes in the lane voltage to detect the presence of the remote agent and prompt initialization of the link. State machine states and timers can be defined in the state machine to coordinate the detection, configuration, and initialization of a link without terminations.

In one implementation, HPI can support re-initialization on an in-band reset without changing the termination values through the screening of a lane by the receiving agent for incoming signaling. The signaling can be used to identify good lanes. As an example, the lane can be screened for any one of a set of pre-defined signals that are to be sent by a transmitter device to facilitate discovery and configuration of the link. In one example, a supersequence can be defined corresponding to one or more initialization or re-initialization tasks. The pre-defined sequence can include an electric idle exit ordered set (EIEOS) followed by additional sequence data. In some instances, as each device on either side of a lane becomes active, the devices can begin sending a supersequence corresponding to a particular initialization state, etc. In one embodiment, two types of pin resets can be supported; power-on (or "cold") reset and warm reset. A reset initiated by software or originating (in the Physical or another layer) on one agent may be communicated in-band to the other agent. However, due to usage of an embedded clock, an in-band reset may be handled by communication to another agent using an ordered set, such as a specific electrical ordered set or EIOS.

The ordered set can be sent during initialization and a PHY control sequence (or "blocking link state") can be sent after initialization. The block link state can block the link layer from sending flits. As another example, link layer traffic may be blocked to send a few NULL flits which may be discarded at the receiver.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, Compliance, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1 KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Turning to FIG. 8, representations of example supersequences are shown. For instance, an exemplary Detect supersequence 805 can be defined. The Detect supersequence 805 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 8, the EIEOS can reappear on the lanes approximately once every one thousand UIs (~1 KUI) followed by the remainder of the Detect supersequence 805. A receiver can monitor lanes for the presence of a repeating Detect supersequence 805 and upon validating the supersequence 705 can conclude that a remote agent is present, has been added (e.g., hot plugged) on the lanes, has awoke, or is reinitializing, etc.

In another example, another supersequence 810 can be defined to indicate a polling, configuration, or loopback condition or state. As with the example Detect supersequence 805, lanes of a link can be monitored by a receiver for such a Poll/Config/Loop supersequence 810 to identify a polling state, configuration state, or loopback state or condition. In one example, a Poll/Config/Loop supersequence 810 can begin with an EIEOS followed by a predefined number of repeated instances of a TS. For instance, in one example the EIEOS can be followed by thirty-one (31) instances of TS with the EIEOS repeating approximately every four thousand UI (e.g., ~4 KUI).

Further, in another example, a partial width transmitting state (PWTS) exit supersequence 815 can be defined. In one example, a PWTS exit supersequence can include an initial EIEOS to repeat to pre-condition lanes in advance of the sending of the first full sequence in the supersequence. For instance, the sequence to be repeated in supersequence 815 can begin with an EIEOS (to repeat approximately once every 1 KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 815 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 805 and Poll/Config/Loop supersequence 810, Compliance supersequence 820, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 805) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 805.

In another example, lanes can be monitored for supersequences and use the supersequences in connection with the screening of lanes for detect, wake, state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions.

FIG. 9 represents an example training sequence (TS) in accordance with one example. In FIG. 9, a training sequence 905 can include a header 910 and various fields that can be used to communicate information in connection with initialization of a link. For instance, in one example, fields for target latency 915, state 920, lane pair number 925, lane mapping 928 among other fields can be included. For instance, a scrambler synchronization field 930 can additionally be provided to assist, among other functions, in synchronizing linear feedback shift registers (LFSR) at a device to allow descrambling of TS fields. Other reserved fields (e.g., 955, 960) can also be included in a training sequence (e.g., 905).

A TS header 910 can include additional fields that can be used to communicate training sequence type (e.g., from which initialization state can be determined or inferred) 935, ACK/NAK fields 940 (e.g., for use in handshaking), lane number fields 945, and other fields, including reserved fields. In some implementations, portions of a TS can be scrambled, for instance, by a random or pseudo-random binary sequence (PRBS). In one examples, the TS header 910 can be preserved as cleartext while the remainder (or body (e.g., 950)) of the TS is scrambled, for instance, by XORing those portions of the TS with a PRBS, among other examples.

In one implementation, a TS can be sixteen (16) bytes in length and the TS header can occupy the first byte (i.e., byte 0) of the TS. The TS payload can be scrambled and occupy the remaining fifteen bytes. In one example implementation, a TS tail or suffix can include the last few bytes of the TS. For instance, in one example, a scrambling synchronization field 930 can occupy at least three bytes of the TS, for instance bytes 6-8 of the TS. The tail bits of the TS (e.g., bytes 9-15), in this particular implementation, can be maintained as reserved bits (e.g., 955). Bits in bytes 6-15 can all be set to 0.

In some implementations, HPI can supports use of a TS header (e.g., 910) can be utilized instead of or in addition to a TS payload for key initialization parameters. In some implementations, TS payload may be used to exchange initialization parameters like ACKs and lane numbers. DC levels for communicating lane polarity may also be used. However, in some implementations, HPI can implement DC-balanced codes in the TS header (e.g., 910) for key parameters. For instance, in instances where a TS header is unscrambled, available TS header codes can be defined so that the number of "1"s substantially equal the number "0"s appearing in the TS header fields (e.g., 935, 940, 945). DC balance can be realized throughout the remainder of the TS (e.g., the TS payload) by scrambling bits of the TS payload by XORing the bits against a random or pseudorandom binary sequence.

In one example implementation, a PRBS sequence can be utilized with at least 23 bits (PRBS23). The PRBS can be generated according to a particular selected polynomial. In one example, the PRBS can be generated by a similar bit size, self-seeded storage element, such as a linear feedback shift register (LFSR). The LFSR can be a 23-bit Fibonacci LFSR capable of generating a PRBS sequence of over 8 Mb in length. The PRBS can repeat following the end of the sequence. In some implementations, the entirety of the PRBS23 sequence can be used in the scrambling of training sequences included in supersequences used, for instance, in initialization of the link in HPI.

While the full length of a PRBS sequence can be used, in some implementations, HPI can support allowing the use of varying lengths of the available PRBS sequence (e.g., the use of only a portion of the PRBS23 sequence). In some examples, a controller of a device can specify that only a portion of the full length of a PRBS sequence be utilized. This can be desirable, for instance, in testing applications where repeatability of bit sequences is desired, among potentially other applications. A software-based controller can specifying varying lengths of the PRBS to be applied. For instance, BIOS of a device can specify the PRBS length to be applied on the link. In some implementations, use of the full length of the PRBS sequence can be the default setting, for instance, so as to maximize the benefits of the lengthy PRBS sequence.

Lane traffic in a transmitting link state (TLS) and training sequences can be scrambled with a PRBS of a particular minimum length (e.g., 23 bits). The starting seed applied to a stream can be varied between the lanes to enhance the electrical benefits of the PRBS on the link. In one example implementations, the PRBS can be generated by a 23 bit Fibonacci LFSR implementing a 6-tap generator polynomial, such as, $(x^{23}+x^{21}+x^{16}+x^{8}+x^{5}+x^{2}+1)$.

The starting (on scrambler/descrambler initialization) seed values for lane number modulo 8 may be any value, for instance, 8 hexadecimal values where each one is associated with 2 or 3 of the lanes in a link. Use of such seeds can result in rotating (or staggering) of the PRBS between the lanes. The number of LFSRs can be reduced by using the property that even lane PRBS can be derived from an XOR of PRBS of odd lanes. The EIEOS and header of the training sequences are not scrambled. The entry point of a supersequence on each lane can be initiated (e.g., where the transmitter starts driving) at a different point on each lane. This can enable the lanes to be turned on in a staggered manner in order to reduce noise in the power delivery system. Indeed, each lane can have its own instance of an LFSR. The staggering times can vary by the number of lanes being turned on and may be implementation dependent during initialization. These can be specified in the timing diagrams and timer profiles for partial transmitting width state exit. Further, fast training sequences (FTS) (also discussed below) can also be rotated by lane.

In some instances, scrambling can reduce power supply noise at transmitter and provide a richer frequency spectrum at receiver. The scrambler can be initialized by the first EIEOS transmitted. The descrambler can be synchronized to the scrambler, for instance, through self-seeding. For instance, the received 23 bit pattern can be embedded in a field of the TS as a seed. In one example, the 23 bit seed can be identified from the scrambling of the bits of the scrambling synchronization field (e.g., 950). The receiver can utilize the seed value to identify the specific location of the PRBS used to scramble the received TS. For instance, a receiver can identify the seed and load the seed into its own LFSR to synchronize to the PRBS used by the transmitter. In some instances, a receiver may read multiple scrambling synchronization field or multiple TSes in a supersequence in order to seed its own LFSR. Upon detecting and synching to the PRBS of the transmitter however, a receiver can descramble the remainder of the TSes as well as all subsequent TS sent in supersequences during initialization of the link, among other examples.

Supersequences can be used to facilitate bit lock and synchronization on a lane. As discussed above, at least a portion of the supersequences can be scrambled. Returning to the discussion of FIG. 8, a detect supersequence can be used by a receiver to detect, or lock, the bit and byte edges of the received bit stream and identify which bytes are being sent in the supersequence. For instance, the EIEOS and TS header can be left unscrambled to assist the receiver in more quickly locking to the supersequence. Additionally, the supersequence can be defined to allow the EIEOS (and beginning of the supersequence) to repeat at a relatively short frequency (e.g., to more quickly allow the receiver another chance to detect the EIEOS in the event that the first EIEOS was not accurately detected). For instance, in one example, a supersequence can be defined to repeat every 1 KUI or shorter. Such supersequences can further allow more randomized transitions during initialization, as well as simplifying TS lock, latency fixing, and other actions.

Additionally, leaving the EIEOS and TS header unscrambled can allow byte lock to occur and permit the receiver to be able to identify the location of subsequent bytes and symbols (including scrambled TS symbols). For instance, the edge of the unscrambled TS header can be identified and thereby also the start of scrambling synchronization field (e.g., 950) (e.g., by simply counting the number of bytes from the edge of the TS header to the symbol). Upon detecting the PRBS seed in the scrambling synchronization field, the receiver will know the following PRBS pattern values and will also be able to predict the values of subsequent scrambling synchronization field (e.g., 950) values. Accordingly, the receiver, upon locking to the PRBS can further utilize the scrambling synchronization field (e.g., 950) values to facilitate other configuration tasks such as adaptation, deskew, and other tasks.

On multi-lane links, symbols can be sent simultaneously on all lanes by a transmitter, however, link-to-link skew can manifest with some symbols not arriving at the receiver at the same time. Sources of skew can include, for instance, chip differential drivers and receivers, printed wiring board impedance variations, lane wire length mismatches, among other examples. In one embodiment, HPI provides advanced logic to deskew lanes. As an example, the TS boundary after TS lock can be used to deskew the lanes. For instance, TS lock can be used to detect skew (e.g., that a TS is arriving on one lane later than another TS on another one of the link's lanes). An EIEOS can also be used to detect skew. In addition, using the predictability of a synched PRBS pattern, some implementations of HPI may deskew by comparing lane PRBS patterns in the LFSR during specific points in the payload. Further, in some instances, scrambling of training sequences can be re-initialized and deskew can be performed by doing a table lookup of PRBS values during the re-seeding of the training sequence, among other examples. Deskew can be useful in testchips, for instance, which may lack ability to detect TS or state machines to manage the deskew, among other examples.

Upon detecting skew, HPI logic (e.g., provided through a software-supported controller) can identify the skew on each lane relative to other lanes in a link and adjust the lanes to attempt to eliminate the skew. For instance, "faster" lanes can be artificially slowed based on the delay detected in a lane-to-lane skew to accommodate the symbols of the "slower" lanes arriving substantially simultaneously with the delayer "faster" lanes, among other examples.

In the case of adaptation, electrical characteristics of a lane can be adjusted between a transmitter and receiver based, for instance, on sample data transmitted between the transmitter and receiver. For instance, receiver adaptation can include the transmitter sending a data pattern to the receiver with logic at the receiver adjusting electrical characteristics at the receiver to adapt the lane for the link. Transmitter adaptation can involve the transmitter sending sample data to the receiver and the receiver sending feedback to the transmitter that can be used by the transmitter to make adjustments at the transmitter to adapt the lane. The receiver can continue to send feedback to the transmitter based on the adjustments made at the transmitter.

In one example, adaptation sample data can be embodied through scrambled TS data. As one example, a fixed UI pattern may be utilized to scramble with a bypass to an adaptation state. But by scrambling TS with PRBS23, receiver adaptation may be performed without the bypass. In addition, offset and other errors may be reduced during clock recovery and sampling. The randomness provided through the a long PRBS sequence (e.g., PRBS23) can prove an effective sample stream for adaptation. Further, in some implementations, a lane can be set to operate in slow mode to assist the logic in analyzing and adapting to sample data received on the lane. Upon approving the characteristics of the lane through adaptation, the adapted characteristics can be set and applied to the initialization of the link.

Once the link has been successfully calibrated and configured, initialization can end and transition to the transmitting link state (TLS) in which flits begin to be transmitted. In some implementations of HPI, transitions to TLS can be based on planetary alignment on the system. For instance, a planetary alignment signal can indicate an opportunity to transition to TLS. Rather than transitioning at an edge of a supersequence, EIEOS, or TLS, some implementations of HPI can utilize a start of data sequence (SDS) symbol sent in accordance with the planetary alignment to end initialization and transition to TLS. In one example, an SDS can be sent anywhere in an initialization bit stream. Accordingly, a receiver can continuously scan received bits for the SDS to hasten ending of the initialization in accordance with a planetary alignment.

In one example, an example EIEOS can emulate a low frequency clock signal, such as a repeating FF00 signal. An example SDS can include a repeating F0 signal in some implementations. Accordingly, in such instances, detecting an SDS sent in the middle of an EIEOS can be relatively simple to identify, as the risk of aliasing within the EIEOS can be minimal. Scrambling of TS payloads, however, and the resulting randomness of the TS data can introduce the risk of aliasing of some forms of an SDS. In some implementations, a PRBS can be generated that will never alias an SDS over any particular span of a number of bits. Further, a tail or suffix can be provided on a TS, such as using the last bytes of the TS to cause the PRBS to be XOR 0 values in the suffix and effectively present the PRBS in cleartext at the end of the TS. If the suffix is sufficiently long, the PRBS values reflected in the scrambled suffix can make it virtually impossible for an SDS to be aliased in the scrambled payload of a TS. For instance, in one example, the SDS can be defined as ten consecutive bytes of the value F0 (i.e., 1111000011110000 . . . ). Further, a suffix of seven reserved bytes can be provided in a TS immediately following three bytes of a scrambling synchronization field (e.g., 950), as shown for instance in the example of FIG. 9. As a result, the length of the zeroed TS suffix (e.g., ten total bytes) can correspond to the SDS value (e.g., ten bytes of F0) chosen which has been selected as not appear within a selected scrambling PRBS (e.g., PRBS23), among other examples. For instance, based on the polynomial utilized in an implementation of PRBS23 (or another PRBS) no ten byte sequence in PRBS23 will ever equal the selected SDS value, among other examples.

Returning to FIG. 8, in some implementations, a Compliance supersequence 820 can adopt the use of a training sequence different from that used in other supersequences of the state machine. For instance, a compliance sequence (CS) can be defined. In the example of FIG. 8, the Compliance supersequence 820 can include alternately sending an EIEOS and a CS, with the EIEOS repeating approximately every 4K UI. In one example, CS can adopt a pattern defined by an initial 32UI compliance pattern (illustrated in Table 1 below) followed by 4K UI of PRBS generated with an LFSR and corresponding starting seeds:

TABLE 1

Compliance Pattern

| Lane | Pattern |
|---|---|
| 0, 12, 8 | 0x9894_bd6c |
| 1, 13, 9 | 0x914c_57f0 |
| 2, 14, 10 | 0x91bc_718c |
| 3, 15, 11 | 0x00f0_267c |
| 4, 16 | 0xfc0f_6d40 |
| 5, 17 | 0xfcff_4b3c |
| 6, 18 | 0xf527_a1a0 |
| 7, 19 | 0x09d8_ea9c |

Compliance state can involve a transition from the sending of training sequences (e.g., TS1 in Detect) to CS in Compliance. Indeed, Compliance can be entered on a TS boundary. Compliance can be used to investigate jitter or noise issues by using a bit error rate tester tester (BERT) and configuring the agent in a Compliance slave. Compliance can also be used to debug a link by configuring one agent as a compliance master, the other as a compliance slave, and manually overriding the voltage and timing offsets on either agent. A link can be explored in Compliance by configuring an agent in self-loopback, to force compliance master and manually override the voltage and timing offsets. Compliance can also be used to explore transmitter operation with various patterns in Loopback Pattern by configuring agent as a compliance master, among other examples. A Start Test command register can be used to determine whether to exit from Compliance to either the Reset or Loopback Pattern states. Table 2 outlines example Compliance conditions that can be defined:

TABLE 2

Agent State Compliance

| State | Compliance |
|---|---|
| Master | Tx: |
| | Drive PatCompliance supersequence |
| Slave | Tx: |
| | Drive PatCompliance until Rx actions (if any) completed; then loopback re-timed non-deskewed Rx |
| Exit | IF (CPReset OR (NOT CRxResetDis AND RxReset)) |

TABLE 2-continued

Agent State Compliance

| State | Compliance |
|---|---|
| | Exit to ResetS |
| | IF CPStartTest |
| | Init LFSR in pattern generator and checker, STxLoopCount, SRxLoopCount and exit to Loopback.Pattern |

For instance, software controllers can be provided to assist in managing state transitions. For instance, if the software controller has ordered a CPReset or an inband reset has been received, the state can transition to reset. If the software controller, instead, writes to the CPStartTest register, the state can transition to Loopback Pattern after initialization of the LFSR and the transmitter and receiver counters used to determine length of stay in Loopback Pattern.

Figure 10:
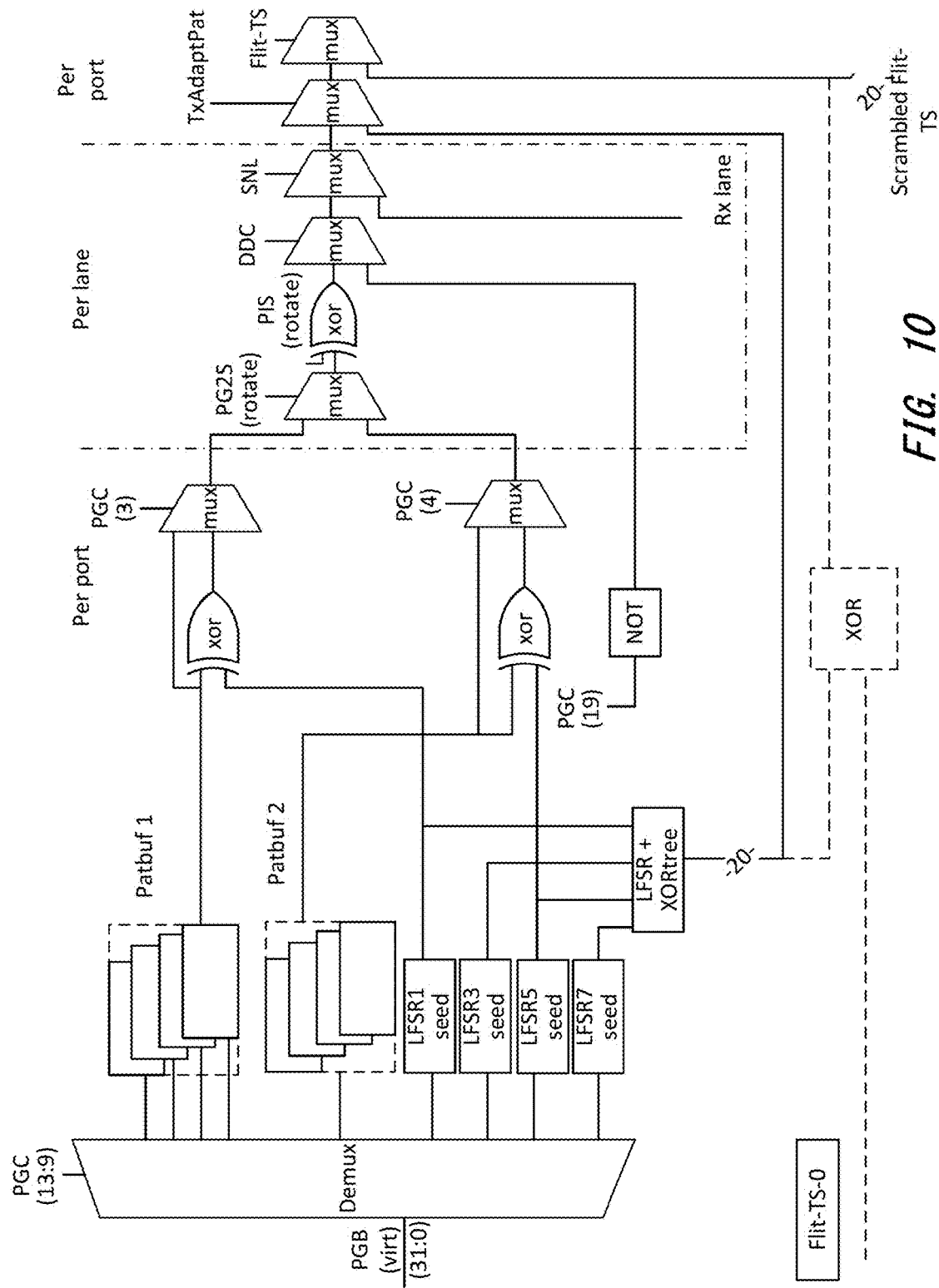
FIG. 10 illustrates a schematic diagram of an example pattern generator.

Pattern generators may be activated in Compliance, Loopback and other states, for instance, to generate supersequence patterns such as those shown and described in FIG. 8. In one embodiment, a pattern generator, such as the example pattern generator illustrated in the simplified block diagram of FIG. 10, can includes one or more pattern buffers, each having a specified size (e.g. 128 bits) and a plurality of 23-bit (or other length) LFSR seed buffers accessed through a structure, such as a register. The words of pattern generators may be indirectly addressed through pattern buffer selection.

In one example implementation, the content of a pattern buffer is sent in each of the enabled lanes serially starting with least significant bit first. Each lane may select any buffer utilizing a register mechanism. All the lanes selecting the same pattern buffer transmit the same data in a UI. Each pattern buffer may also be independently scrambled by a 23 bit pseudo random generator, which is enabled using bits in a register, such as a pattern control register. The transmission in any lane may be inverted individually using a Pattern Invert Selection Register, for instance. An auto inversion feature may be enabled to generate cross talk pattern using auto inversion enable bit of a Pattern Generator Control Register, among other examples. For transmitter adaptation using loopback, the staggered PRBS23 pattern can be selected. This pattern may also be used to scramble the flits in low power state. The number of patterns sent may be more than the loop count in pattern generator control register, as a loop count refers to the total number of 128 bit patterns received. The master may send an integral number of 128 UI patterns. The pattern generator content can be transmitted continuously until at least one of three exit conditions occurs: (i) if the loop count status is equal to the Exponential Loop count; (ii) Stop On Error is set in the register and an error on any Lane has occurred; or (iii) Stop Test is set in the register. By default, transmitter lanes that have not been detected as indicated by lane dropped in a Transmitter Data Lane Dropped Status Register and dropped receiver lanes as indicated by receiver lane dropped in the Receiver Data Lane Dropped Status Register do not transmit or compare any patterns. If the Include Dropped Lanes bit is set in the Pattern Generator Control Register, dropped lanes also drive and check patterns in Loopback Pattern State. Disabled lanes may not participate in testing. Further, slave transmitter lane content can be controlled via the Slave Loopback Path Select Register to either loopback the content from the Rx lane or to select the pattern generator. In some instances, there may be no alignment requirement between the looped back data and the slave generated pattern, among other features, structures, and examples.

In the case of debouncing, transients can be introduced on lanes as a result of a variety of conditions. For instance, the addition or powering-on of a device can introduce transients onto the lane. Additionally, voltage irregularities can be presented on a lane because of poor lane quality or electrical failure. In some cases "bouncing" on a lane can produce false positives, such as a false EIEOS. However, in some implementations, while supersequences can begin with an EIEOS, defined supersequences can further include additional sequences of data as well as a defined frequency at which the EIEOS will be repeated. As a result, even where a false EIEOS appears on a lane, a logic analyzer at the receiver can determine that the EIEOS is a false positive by validating data that succeeds the false EIEOS. For instance, if an expected TS or other data does not follow the EIEOS or the EIEOS does not repeat within a particular one of the predefined frequencies of one of the predefined supersequences, the receiver logic analyzer can fail validation of the received EIEOS. As bouncing can occur at start up as a device is added to a line, false negatives can also result. For instance, upon being added to a set of lanes, a device can begin sending a Detect supersequence 805 to alert the other side of the link of its presence and begin initialization of the link. Suddenly sending such a signal on previously idle lanes, however, can introduce transients on the lanes that may corrupt the interpretation of the initial EIEOS, TS instances, and other data of the supersequence. However, a logic analyzer on the receiving device can continue to monitor the lanes and identify the next EIEOS sent by the new device in the repeating Detect supersequence 805, among other examples.

In some implementations, lane debouncing can include checking for sustained assertion of a detect signal. External signals are debounced in the physical layer to avoid reacting to transients or noise on the lanes. The debouncing can initially take place on one or two monitor lanes and then eventually, or gradually, carried out further on all lanes. AS some state actions only involve a subset of the available lanes, debouncing may be programmatically restricted to these lanes where signaling is to occur. The debouncing technique adopted by an agent can be design-specific, although a maximum debounce time can be specified for all devices within a system. The maximum debounce time can be specified in one or more registers. The maximum debounce time can be defined to correspond to a detection window large enough to allow the detection of forthcoming bit values in the supersequence, such that the supersequence is properly identified (e.g., and not a false negative (or positive) from aliasing). However, high speed links can be very latency sensitive making it desirable to constrain the maximum debounce window such that one agent is not "stuck" waiting for the other in a Detect or other state (i.e., beyond the defined maximum debounce window). In one example, minimum debounce time can be defined (e.g., the RxDetect debounce time per leg) and a maximum debug time can be defined as three times the minimum debounce time, among other examples. In some cases, the minimum debounce time can be set as a minimum values, for instance, based on the results of operational analysis, simulation, and testing of sample silicon systems, among other examples. For instance, regardless of the value, the minimum (and maximum) debounce time can be defined to be the same on two interconnected agents so as to limit skew between two sides exiting RxDetect, among other considerations.

In one example, a transmitting device can attempt to enter a particular state. For instance, the transmitting device can attempt to activate the link and enter an initialization state. In another example, the transmitting device can attempt to exit a low power state, such as an L1 state, among other examples. In some instances of an L1 state, the L1 state can serve as a power savings, idle, or standby state. Indeed, in some examples, main power supplies may remain active in the L1 state. In exiting an L1 state, a first device can send a supersequence associated with transitioning from the L1 state to a particular other state, such as an L0 transmitting link state (TLS). The supersequence, as in other examples, can be a repeating sequence of an EOS followed by a predetermined number of TSes such that the EOS is repeated at a particular predefined frequency. In one example, a Detect supersequence can be used to exit the L1 or other low power state. A receiving device can receive, debounce, and validate the data, identifying the supersequence, and the receiving device can complete the handshake with the transmitting device by sending the supersequence back to the transmitting device.

With both the transmitting and receiving devices receiving the same supersequence, each device can further perform additional initialization tasks utilizing the supersequences. For instance, each device can perform debouncing, bit lock, byte lock, descrambling, and deskewing utilizing the supersequences (e.g., using one or more the configuration states outlined, for instance, in the example of FIG. 7). Additional initialization information can be communicated through the headers and payloads of the TSes included in the supersequences (such as shown in the example of FIG. 9). When the link is initialized, a start data send (SDS) sequence can be sent, in some cases, interrupting the supersequence (e.g., sent in the middle of a TS or EIEOS) and the respective devices on either side of the link can prepare for the synchronized entry into TLS. In TLS, or an "L0" state, supersequences can be ended and flits can be transmitted utilizing the Link layer of the protocol stack.

In some implementations of HPI, adaptation of lanes on a link can be supported. The Physical layer can support both receiver adaptation and transmitter, or sender, adaptation. With receiver adaptation, the transmitter on a lane can send sample data to the receiver which the receiver logic can process to identify shortcomings in the electrical characteristics of the lane and quality of the signal. The receiver can then make adjustments to the calibration of the lane to optimize the lane based on the analysis of the received sample data. In the case of transmitter adaptation, the receiver can again receive sample data and develop metrics describing the quality of the lane but in this case communicate the metrics to the transmitter (e.g., using a backchannel, such as a software, hardware, embedded, sideband or other channel) to allow the transmitter to make adjustments to the lane based on the feedback. Receiver adaptation can be initiated at the start of the Polling state using the Polling supersequence sent from the remote transmitter. Similarly, transmitter adaptation can be done by repeating the following for each transmitter parameters. One or both agents can then enter a Compliance or Loopback state to further adaptation of the Link. For instance, Table 3 represents conditions for entering one of a Compliance, Loopback Master, or Reset state from Polling in at least one implementation. In another example, in some implementations, two agents can enter a Loopback Pattern state together as masters and transmit a specified pattern. Both receivers can measure the metric (e.g. BER) for that particular transmitter setting at a remote agent. Both agents can go to Loopback Marker state and then Reset and use backchannels (slow mode TLS or sideband) to exchange metrics. Based on these metrics, the next transmitter setting can be identified. Eventually the optimal transmitter setting can be identified and saved for subsequent use (e.g., in subsequent link states, including transmitting link states).

TABLE 3

Polling

| State | Polling |
|---|---|
| On Entry | IF CSingleStep set SPSSHold<br>Init and Start Tplst<br>IF SInitFall is set, Rx actions are disabled (this must result in secondary timeout) |
| Rx Actions | IF SOpSpeed adapt Rx before performing following Bitlock/Bytelock/TSlock lanes<br>Record and perform polarity inversion and lane reversal as needed<br>Descramble, deskew lanes<br>IF received LoopbackMaster, set SRemoteLBM |
| Tx Actions | All good Tx lanes drive PatPolling (initially with NAK; then with ACK after Rx actions completed) |
| Exit | IF Compliance /\*L0\*/<br>    IF NOT CSinglestep<br>        IF NOT Tplst timeout<br>            IF CompExit AND NOT CATE<br>                Exit to Compliance<br>        ELSE<br>            IF CompExit<br>                Exit to Compliance on TS boundary<br>            ELSE<br>                IF NOT SInitFail and update PH_PIS from PH_CIS once<br>                IF CFIA set SPSSHold once<br>                IF NOT CFIA exit to ResetS<br>                ELSE<br>                      IF SPSSHold cleared, exit to ResetS<br>    ELSE<br>        IF SPSSHold cleared<br>            IF CompExit<br>                Exit to Compliance on TS boundary<br>            ELSE<br>                Set SInitFail and update PH_PIS from PH_CIS<br>                Exit to ResetS<br>ELSE<br>    IF NOT loopback /\*L0\*/<br>        IF NOT CSinglestep<br>            IF NOT Tplst timeout<br>                IF GoodHandshake AND NOT CATE<br>                    Drop bad lanes and update SRxLaneDropped<br>                    Exit to Config.Linkwidth on TS boundary<br>                ELSE<br>                    IF GoodHandshake<br>                      Drop bad lanes and update SRxLaneDropped<br>                      Exit to Config.Linkwidth on TS boundary<br>                  ELSE<br>                      IF NOT SInitFail and update PH_PIS from PH_CIS once<br>                      IF CFIA set SPSSHold once<br>                      IF NOT CFIA exit to ResetS<br>                      ELSE<br>                          IF SPSSHold cleared, exit to ResetS<br>        ELSE<br>            IF SPSSHold cleared<br>                IF GoodHandshake<br>                    Drop bad lanes and update SRxLaneDropped<br>                    Exit to Config.Linkwidth on TS boundary<br>                ELSE<br>                    Set SInitFail and update PH_PIS from PH_CIS<br>                    Exit to ResetS |

For instance, from Polling, a link can exit towards Configuration /L0 or towards Loopback or Compliance. A CInit register can be used by a software controller to determine which of the three states to exit to. In some cases, the state exit can be under software control (via SPSSHold bit) in CSingleStep mode. A failure can results in an exit to ResetS, which can also be mediated by software ((via SPSSHold bit) in CFIA (Freeze on InitAbort) mode, among other examples.

In adaptation, a transmitter of an agent can transmit to a remote receiver a random, or pseudo random pattern. In some instances, scrambled supersequences can be used as the pattern. Logic at the receiver can determine characteristics of one or more lanes of the link and generate metric data describing such characteristics. In the case of receiver adaptation, the receiver can attempt to determine optimal configurations for a lane based on the metrics and apply these configurations at the receiver. In the case of transmitter adaptation, the receiver can communicate metrics to the transmitter for use by the transmitter agent to configure and adapt the lane based on the metric. In either instance, in some implementations, hardware or software can be utilized to assess different transmitter settings in algorithmic order to determine the optimal settings.

Receiver adaptation can be initiated at the start of the Polling state using the Polling supersequence sent from the remote transmitter. Similarly, transmitter adaptation can be done by repeating the following for each transmitter parameters. Both agents can enter Loopback Pattern state as masters and transmit specified pattern. Further, both receivers can measure the metric (e.g. BER) for that particular transmitter setting at a remote agent. Both agents can go to Loopback Marker state and then Reset and use backchannels (slow mode TLS or sideband) to exchange metrics. Based on these metrics, the next transmitter setting can be identified. Eventually the optimal transmitter setting can be identified and saved for subsequent use.

In some implementations, a timer can be used during adaptation. At the conclusion of a predefined timer value, adaptation can be ended, under the assumption that the time value was sufficiently long to permit the transmitter and receiver to have concluded adaptation tasks and successfully adapt the lane. In other implementations, an alternate approach can be utilized to improve the efficiency of adaptation of a link. For instance, in one example, a handshake can be employed to tailor the time spent in adaptation to the time actually used to complete adaptation. In one example, a receiver at a first agent responsible for generating metrics from a sample sent by the transmitter, can send a signal notifying the transmitter that the receiver approves the configuration of the link (or lane(s)) whether adaptation was performed by the receiver or transmitter. Upon receiving the signal, the transmitter can complete the handshake by sending an acknowledgement signal. In some instances, the acknowledgement can indicate similar approval of the link configuration at the transmitter agent, among other examples.

Metric information and other feedback can be communicated from a receiver agent to a transmitter agent in connection with adaptation of a link through a variety of mechanisms. The transmitter, in the case of transmitter adaptation, can identify changes that can be made to one or more attributes of the lane so as to improve the characteristics of the lane. The transmitter can make these changes and send additional sample data on the lanes reflecting these changes. The receiver can then provide additional metric data or feedback, in some instances, to report the quality of the changes. In one example, a receiver can provide metric information through a backchannel. In one example, such a backchannel can be implemented as a software-based backchannel by sending the link (or one or more lanes) into slow mode allowing software tools to analyze the quality of a sample received from the transmitter. The software tool can cause metric information or a configuration recommendation to be communicated to the transmitter agent. This can be accomplished through an in-band communication, software-to-software message, or other means. In another example, a side band channel can be used (when available on the device(s)) as the backchannel. In still another example, a hardware-based channel can be used as the backchannel, such as by reserving one lane between two agents for transmission of the sample and reserving a second lane (at least during an adaptation event) for transmission of the feedback metric data. In still a further example, an embedded channel can be utilized that leverages a control or BLS window for the sending of feedback metric data. The control window can be set to slow mode (e.g., to enable analysis by software), in some examples, while the control interval communicates the sample at operation speed, among other potential examples.

In some instances, adaptation can include the sending of a PRBS (or a PRBS scrambled portion of a supersequence) by the transmitter to the receiver in a Master-Master loopback state. Both agents on a lane can lock to the PRBS and use the sequence as an reference sequence for adaptation. One or both agents can receive the reference sequence and determine whether the reference sequence was reproduced properly at the agent's receiver. One or both agents can then respectively assess the quality of the lane based on a comparison of the received sequence with the expected reference sequence. For instance, a bit error rate can be determined for the lane based on the comparison. Additionally, logic at the transmitter (or at the receiver) can deliberately inject jitter, noise, or other characteristics to the signal prior to sending during the loopback to test the quality of the lane (e.g., whether the signal can still be understood at the receiver despite the noise), among other features. The results of such assessments, including a determined bit error rate, can be included in metric data used to adapt the link.

In some implementations of HPI, design for test features can be provided. In one embodiment, HPI includes hooks to enable post-design test, debug, and validation. An exemplary, non-exhaustive list of such features is included below. Other states and features have been described above that can further be used in testing, debug, and validation. Indeed, the following features are provided by way of example, as some may be omitted, and others may be added, etc.:

Single Step:

Single step includes a debug feature where software may step agents through the initialization states to a link state, such as TLS. A storage element, register, or signal (that is software accessible) may enable this mode. In this mode the agent may set a semaphore on entering a state and perform the state actions. But when an exit condition is reached (including secondary timeouts), the sempahore can cause a next state transition to not be taken. Here, the actual transition may occur at the direction of a software-based controller, such as by clearing the semaphore. This potentially allows software to examine the Physical layer during progress to a transmitting state or Loopback. Note that this may be extended to substates by setting a substate sempahore on entry to a substate, among other examples. The agent may remain in a current state as long as a semaphore, such as a bit in a register, is set. Transition out of every state may be delayed until the hold bit is cleared by an outside agent. State rules defined exit criteria can otherwise be maintained except in cases involving time-outs, etc. The secondary timers may be disabled (e.g., ignored). Here, the clearing of the hold bit can be considered a replacement stimulus emulating the secondary timer time-out for single stepping operation, among other examples. Further, single stepping with the assistance of software can be performed in a manner that supports integrity of the forward progress.

Freeze on Initialization Abort:

This is a debug feature where the agent does not immediately take the transition to a reset state on an initialization abort, delaying or suspending the transition so that software-based tools can identify causes for the abort. For instance, software-based tools can be used to probe reasons for an abort while supporting integrity of the regress and reinitialization. One or more fields of a register holding one or more bits, such as a control register, may control this action. This feature complements single step by giving software control to state exits due to failure (as single step does in case of normal progress). In one embodiment, by default, a Physical layer state machine may retry by immediately transitioning to a reset state after any initialization abort. However, the state machine may be frozen (that is, remain in the same state) at the point of failure, not transition to a reset state by setting initialization abort freeze bit in a register. As an example, when in freeze on initialization abort mode, when an initialization abort occurs, the state machine freezes by setting state machine hold bit, such as the semaphore described above, in a register. Software, in one embodiment, can access registers to read the stopped state and other frozen resources and use the frozen state to debug the state machine. Clearing the hold bit in this frozen state may result in the state machine exiting to Reset. In-band reset, in one embodiment, does not release the hold.

Automated Test Equipment (ATE):

Automated Test Equipment (ATE) may be used to characterize (e.g., margin) the link in the various states including TLS. In this case the ATE can act as an agent and use a predetermined set of transmit patterns to get the device under test (DUT) into TLS. In ATE mode, an ATE mode field to hold one or more bits in a register can be set. The DUT does the same state actions but when an exit condition is reached, the next state transition is not taken and the actual transition occurs when the secondary timeout occurs. Thus, this mode is similar to single step except that transitions occur on pre-programmed timeouts instead of software intervention. For instance, ATE mode can manage a programmable timer based progression thru the states. Longer timers set during the mode can allow handshakes in states to complete while still exiting at time specified by software managing or otherwise used in the ATE mode.

In some instances, high volume manufacturing (HVM) tests may be performed by connecting the transmitter of a DUT port to its own receiver and getting this link pair to TLS where signature patterns for each initialization mode (except loopback or compliance slave) are sent and checked to pass or fail the DUT. This can be accomplished without a special mode, but latency fixing may be performed for checking signature at the correct cycle.

IBIST (Interconnect Built in Self Test):

IBIST uses compliance and loopback states to test the interconnect with built in pattern generators and checkers.

Pattern Check and Error Counting:

Pattern checking can be enabled in a Loopback Pattern. Each receiver lane can compare the received data against transmitted data in a corresponding transmitter lane. The slave side checking can be achieved by programming the same exact pattern generation values in both the Loopback Master and Slave. Start of checking and pattern buffer scrambling can be marked by the end of SDS. Each lane can choose to compare or not depending on a register value. The number of patterns checked can be controlled by a loop count. Every count indicates 128 bits of pattern buffer data. The loop counter can have 5 bits of exponent count to enable testing for long time. Loop count value of zero corresponds to infinite count, in which case, a test can only be terminated by setting the Stop Test bit, in some implementations. In order to accommodate electrical parameter application that is synchronized upon entry to Loopback Pattern, the checking can be masked for a time specified by time value in the Pattern Checker Control Register. Checking can be made selective on any one bit in an interval using selective error check start and selective error check interval in the Pattern Checker Control Register.

During transmitter adaptation in loopback, both agents can act as masters but transmitter sends the pattern and the receiver checks for bit errors. Another difference is that Start Test can be set prior to entering loopback and a structure can be used to delay the actual start of test in Loopback marker (sending SDS). In Loopback Pattern when loop count expires, ending the transmitter adaptation test, the agent can return to the Loopback marker, wait for timeout and then exit to Reset for backchannel operation. When a series of transmitter parameters are being tried, the agent may go back to Loopback Pattern instead of Reset till the last parameter has been tried, among other examples.

Error counting can be performed collectively by per lane and global counters. Error counters can be accessible through the Lane Error Counter Register. The lane being observed and selected toward global counter can be indicated by the Receiver Error Counter Lane Select field in the Pattern Checker Control Register. The least significant 8 bits of the error counter can be available for every lane. The most significant 23 bits of the Lane Error Counter Register can only be available for the selected lane indicated by Receiver Error Counter Lane Select at the time when the state machine enters Loopback Pattern. The Lane Error Counter Register does not stick at the maximum value but instead rolls over to all 0's which is indicated by setting the overflow flag (e.g., bit 31 of Lane Error Counter Register) on a per lane basis. Per lane counters in non-selected lanes freeze on maximum error count can mark an overflow. Initial masking, selective error checking, and Loopcount Stall can also apply to error counters. Software may manually clear the Lane Error Counter Register by writing all 1's to bits 31:0, among other examples.

Lane Reversal:

If lane reversal or polarity inversion is detected at a receiver in Polling, pattern checking (and loopback, if slave) may be done after undoing the reversal and polarity inversion of lanes.

Lane Enable/Disable:

Lanes can be disabled at the transmitter, receiver, or both to cause the link to operate at lower width. It may be the responsibility of a software-based controller or tool to disable correct lanes if they are reversed.

As noted above, both timers and controls (e.g., control signals, handshakes, etc.) can be used to facilitate transitions within a state machine defined on agents within an HPI environment. For instance, timers can be used in some state transitions while signaling can be used in other state transitions. Further, mechanisms can be provided for facilitating state transitions. For instance, as introduced above, an ATE mode or other testing mode can be provided in some implementations that can override some state transition mechanisms, for instance, to assist in management and observation of a test of the system. For example, in one example testing mode, all state transitions can be set, by a test or test administrator, according to a respective timer. Logic can also be provided to assist in configuring states that would ordinarily transition on a control signal to transition based on a defined timer, among other examples. Such other examples can include, for instance, software-controller state transitions such as single stepping (e.g., through freeze on initialization abort), and other examples.

Some systems and devices utilizing HPI can be deterministic such that their transactions and interactions with other systems, including communications over an HPI link, are synchronized with particular events on the system or device. Such synchronization can take place according to a planetary alignment point or signal corresponding to the deterministic events. For instance, a planetary alignment signal can be used to synchronize state transitions, including entry into a link transmitting state, with other events on the device. In some instances, sync counters can be employed to maintain alignment with a planetary alignment signal for the system. For instance, each agent can include a local sync counter which is initialized by a planetary alignment signal (i.e., common and simultaneous (except for fixed skew) to all agents/layers which are in sync). This sync counter can count alignment points correctly even in powered down or low-power states (e.g., L1 state) and can be used to time the initialization process (after reset or L1 exit), including the boundaries (i.e., beginning or end) of an EIEOS (or other EOS) included in a supersequence utilized during initialization. Such supersequences can be fixed in size and greater than max possible latency on a link. EIEOS-TS boundaries in a supersequence can thus be used as a proxy for a remote sync counter value.

Further, HPI can support master-slave models where a deterministic master device or system can drive timing of interaction with another device according to its own planetary alignment moments. Further, in some examples, master-master determinism can be supported. Master-master or master slave determinism can ensures that two or more link-pairs can be in lock-step at the Link layer and above. In master-master determinism, each direction's exit from initialization can be controlled by respective transmitter. In the case of master-slave determinism, a master agent can control the determinism of the link pair (i.e., in both directions) by making a slave transmitter initialization exit wait for its receiver to exit initialization, for instance, among other potential examples and implementations.

In some implementations, a synchronization (or "sync") counter can be utilized in connection with maintaining determinism within an HPI environment. For instance, a sync counter may be implemented to count a defined amount, such as 4096 UI. This sync counter may be reset by an asynchronous event and may count continuously (with rollover) from then (potentially even during a low power link state). Pin-based resets (e.g., power on reset, warm reset) may be synchronizing events that reset a sync counter, among other example. In one embodiment, these events can occur at two sides with skew less (and, in many cases, much less) than the sync counter value. During initialization, the start of the transmitted exit ordered set (e.g., EIEOS) preceding a training sequence of a training supersequence may be aligned with the reset value of the sync counter (e.g., sync counter rollover). Such sync counters can be maintained at each agent on a link so as to preserve determinism through maintaining constant latency of flit transmissions over a particular link.

Control sequences and codes, among other signals, can be synchronized with a planetary alignment signal. For instance, EIEOS sequences, BLS or L0c windows (and included codes), SDSes, etc. can be configured to be synchronized to a planetary alignment. Further, synchronization counters can be reset according to an external signal, such as a planetary alignment signal from a device so as to itself be synchronized with the planetary alignment, among other examples.

Sync counters of both agents on a link can be synchronized. Resetting, initializing, or re-initialization of a link can include a reset of the sync counters to realign the sync counters with each other and/or an external control signal (e.g., a planetary alignment signal). In some implementations, sync counters may only be reset through an entry into a reset state. In some instances, determinism can be maintained, such as in a return to an L0 state, without a reset of the sync counter. Instead, other signals already tuned to a planetary alignment, or other deterministic event can be used as a proxy for a reset. In some implementations, an EIEOS can be used in a deterministic state entry. In some instances, the boundary of the EIEOS and an initial TS of a supersequence can be used to identify a synchronization moment and synchronize sync counters of one of the agents on a link. The end of an EIEOS can be used, for instance, to avoid the potential of transients corrupting the start boundary of the EIEOS, among other examples.

Latency fixing can also be provided in some implementations of HPI. Latency can include not only the latency introduced by the transmission line used for communication of flits, but also the latency resulting from processing by the agent on the other side the link. Latency of a lane can be determined during initialization of the link. Further, changes in the latency can also be determined. From the determined latency, latency fixing can be initiated to compensate for such changes and return the latency expected for the lane to a constant, expected value. Maintaining consistent latency on a lane can be critical to maintaining determinism in some systems. For instance, a test mode can assume consistent latency and latency fixing can be enforced during the test to guarantee this consistent latency, among other use cases and examples.

Latency can be fixed at a receiver link layer to a programmed value in some implementations using a latency buffer in conjunction with determinism and enabled by starting a detect (e.g., by sending a Detect supersequence) on a sync counter rollover. Accordingly, in one example, a transmitted EIEOS (or other EOS) in a Polling or other configuration link state can occur on a sync counter rollover. In other words, the EIEOS can be precisely aligned with the sync counter, such that a synchronized EIEOS (or other EOS) can serve as a proxy, in some instances, for the sync counter value (and planetary alignment signal) itself, at least in connection with certain latency fixing activities.

Figure 11A:
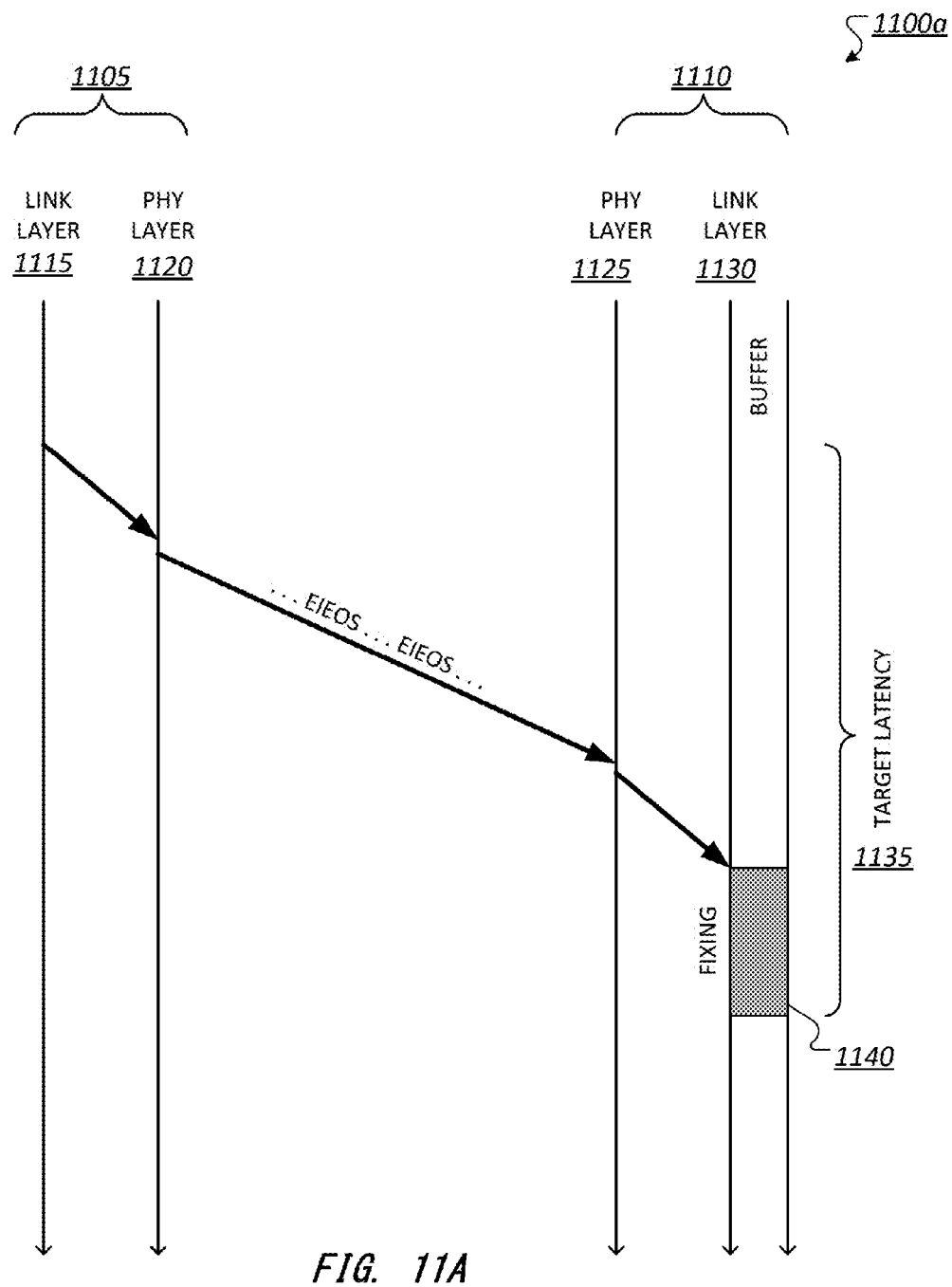
FIGS. 11A-11B illustrate a representation of an example signal sent over an example data link.

Turning to the example of FIG. 11A, a representation 1100a is shown of signaling on a link between a first device 1105 and a second device 1110. In some implementations, latency can be measured from the time a message (e.g., a flit) is sent from the link layer 1115 of the first device, proceeds to the physical layer 1120 and over the link to the physical layer 1125 and then the link layer 1130 of the second device 1110. In other words, latency can be measured from link layer 1115 to link layer 1130. A target latency 1135 can be set. For instance, the target latency can be communicated in one or more training sequences (e.g., as encoded in a training sequence header) sent over the link. The training sequences may be sent in a supersequence sent from the first device to the second device, such as during a Detect or Polling state. The signal sent to the second device can include a repeating sequence that includes an EIEOS that repeats according to a defined frequency and whose boundaries are synchronized with a sync counter. Accordingly, the second device can receive an EIEOS and determine the sync counter value on which the EIEOS was sent. Further, the EIEOS can determine the latency between the link layers 1115, 1130 by calculating the difference between the sync counter value when the EIEOS was sent from device 1105 and the time (e.g., in UIs) at which the EIEOS was received at the link layer 1130 of the second device 1110. Upon determining the actual nominal latency between the link layers 1115, 1130, the second device 1110 can utilize latency fixing logic to identify the target latency 1135 and add latency (e.g., from a latency buffer) to the received EIEOS so that it meets the dictated target latency at the PHY-Link layer interface. As an example, if the target latency is 96 UI and the receiver EIEOS after deskew is at sync count 80 UI, 16 UI of latency can be added. In essence, given the synchronization of an EIEOS, latency of a lane can be determined based on the delay between when the EIEOS was known to be sent (e.g., at a particular sync counter value) and when the EIEOS was received. Further, latency can also be fixed at the first device (e.g., by adding latency to the transmission of an EIEOS based on second device sending the delta value in the TS, etc.).

As shown in the example of FIG. 11A, if the depth of the latency buffer at the second device 1110 possesses is sufficiently deep to provide the additional latency (e.g., 1140) to "fix" the nominal latency to meet the target latency 1135. In such cases, the latency fixing is considered a success, and the fixed latency can be applied to the link to maintain the target latency. In some instances, the target latency may be too high and the latency buffer may not be sufficiently deep to bridge the gap between the nominal latency and the target latency. In such instances, the second device 1110 can detect the shortfall in the latency buffer when determining the amount of latency to be added to an incoming signal and trigger a latency buffer error. Such an error may not interfere with operation of the link but may nonetheless cause the error to be reported. The reported error can be used, in some instances, by software as feedback to iteratively adjust the target latency downward to a more manageable (and accurate) value.

Figure 11B:
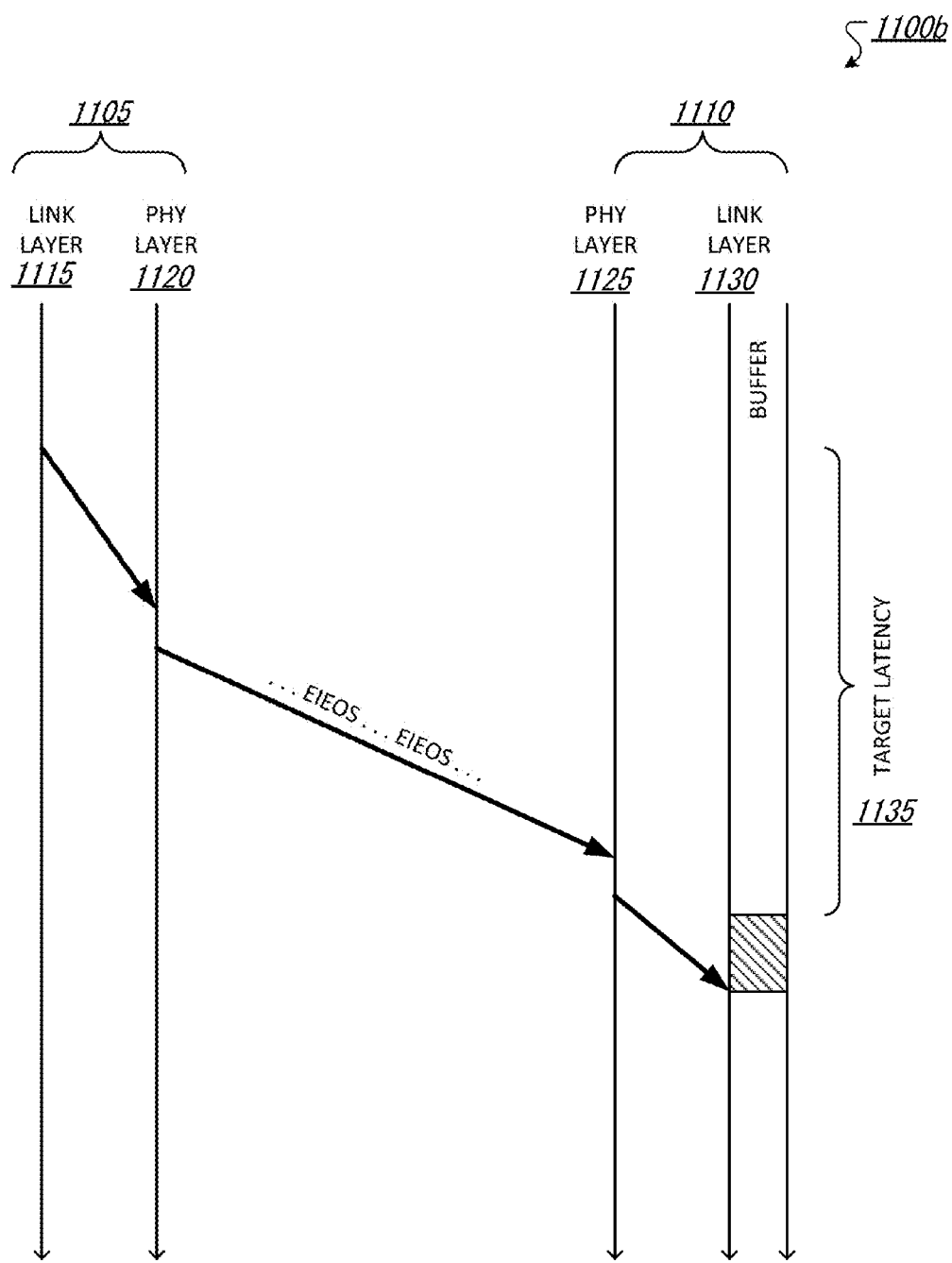

In another example illustrated in the representation 1100b of FIG. 11B, instances may arise when the nominal latency exceeds the target latency. In such instances, the target latency may only be realized by applying negative fixing of the latency. In some implementations, delay may be built-in to the link and the devices 1105, 1110 can negotiate the reduction of the delay to attempt to provide the negative latency fixing. In other examples, negative latency fixing may be unavailable, such as in the example of FIG. 11B. Accordingly, upon detecting the negative gap between the nominal and target latencies, the receiving device (e.g., 1110) may signal an error. Like a latency buffer error, a negative latency fix error may also allow the link initialization and adaptation to continue uninterrupted, but without latency fixing. Further, a negative latency fix error can likewise be reported and can be used by software to automatically adjust the target latency value (as recorded in one or more registers) upward such that the target is more in line with the observed nominal latency and future latency fixing errors are avoided.

Latency fixing can be used within the context of determinism to permit an external entity (such as an entity providing a planetary alignment signal) to synchronize the physical state of two agents across the link in two directions. Such a feature can be used, for example, in debugging problems in the field and for supporting lock-step behavior. Accordingly, such implementations can include external control of one or more signals that may cause the Physical layer to transition to a transmitting link state (TLS) on two agents. Agents possessing determinism capabilities can exit initialization on a TS boundary or a previous clean flit boundary when or after the signal is asserted. Master-slave determinism may allow a master to synchronize the Physical layer state of master and slave agents across the link in both directions. If enabled, the slave transmitter exit from initialization can depend on (e.g., follow or be coordinated with) its receiver exit from initialization (in addition to other considerations based on determinism). Agents which have Determinism capability may additionally possess functionality for entering a BLS or L0c window on a previous clean flit boundary, among other examples.

Determinism may also be referred to as automated test equipment (ATE) when used to synchronize test patterns on ATE with a device under test (DUT) controlling physical and link layer state by fixing latency at the receiver link layer to a programmed value using a latency buffer.

In some implementations, determinism in HPI can include facilitating the ability of one agent to determine and apply a delay based on a deterministic signal. A master can send an indication of a target latency to a remote agent. The remote agent can determine actual latency on a lane and apply a delay to adjust the latency to meet the target latency (e.g., identified in a TS). Adjusting the delay or latency can assist in facilitating the eventual synchronized entry into a link transmitting state at a planetary alignment point. A delay value can be communicated by a master to a slave, for instance, in a TS payload of a supersequence. The delay can specify a particular number UIs determined for the delay. The slave can delay entry into a state based on the determined delay. Such delays can be used, for instance, to facilitate testing, to stagger L0c intervals on lanes of a link, among other examples.

As noted above, a state exit can be take place according to a planetary alignment point. For instance, an SDS can be sent to interrupt a state supersequence can to drive transition from the state to another state. The sending of the SDS can be timed to coincide with a planetary alignment point and, in some cases, in response to a planetary alignment signal. In other instances, the sending of an SDS can be synchronized with a planetary alignment point based on a sync counter value or other signal synchronized to the planetary alignment. An SDS can be sent at any point in a supersequence, in some cases, interrupting a particular TS or EIEOS, etc. of the supersequence. This can ensure that the state transitions with little delay while retaining alignment with a planetary alignment point, among other examples.

It should be appreciated that other details and features can be provided in a high-performance interconnect in addition to those described above. For instance, a high-performance interconnect can apply one or more features and principles described in U.S. patent application Ser. No. 14/060,191, entitled "High Performance Interconnect," which is incorporated herein by reference.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 12:
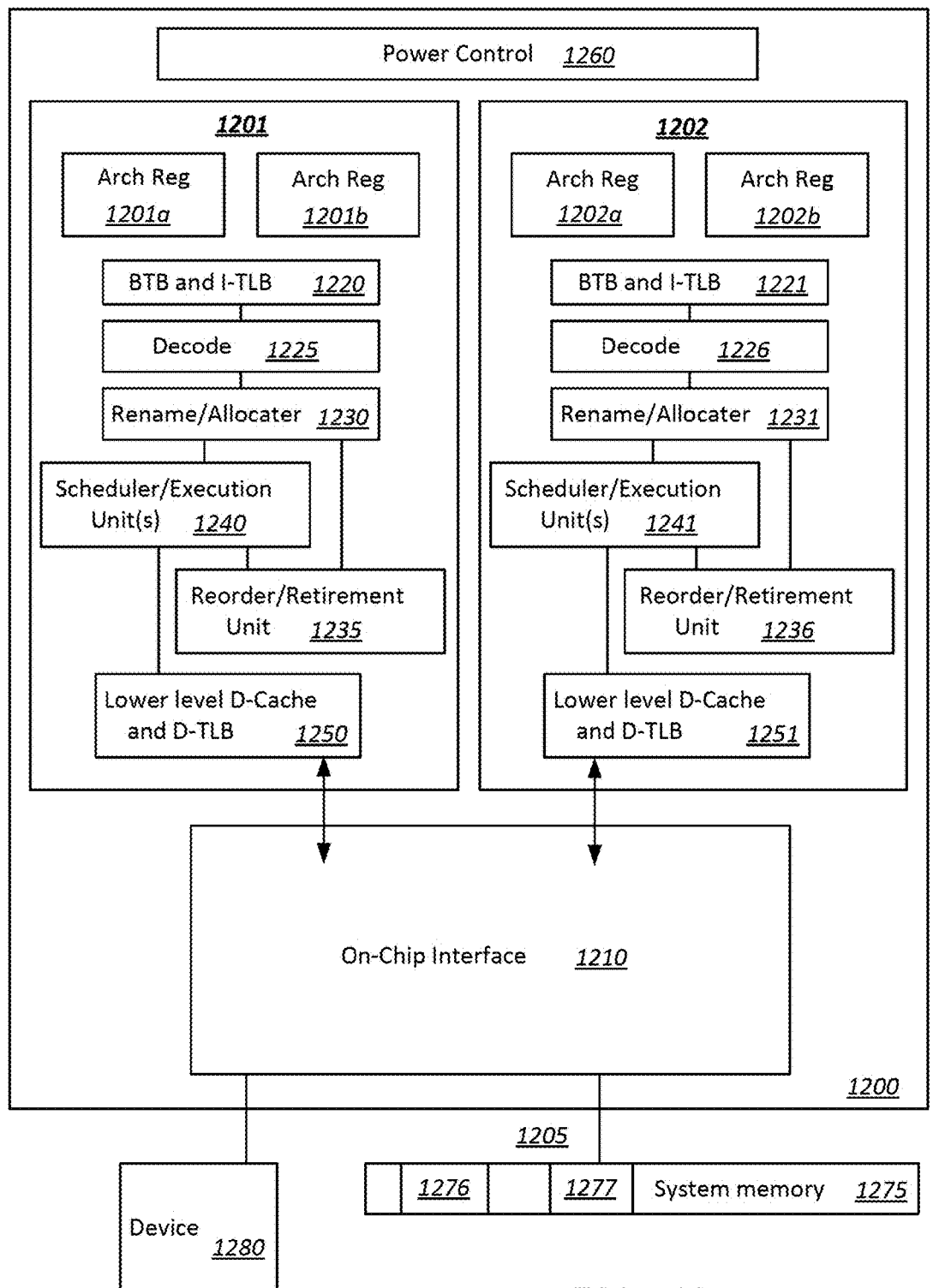
FIG. 12 illustrates an embodiment of a block diagram for a computing system including a multicore processor.

Physical processor 1200, as illustrated in FIGS. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201a and 1201b, which may also be referred to as hardware thread slots 1201a and 1201b. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201a, a second thread is associated with architecture state registers 1201b, a third thread may be associated with architecture state registers 1202a, and a fourth thread may be associated with architecture state registers 1202b. Here, each of the architecture state registers (1201a, 1201b, 1202a, and 1202b) may be referred to as processing elements, thread slots, or thread units, as described above. As illustrated, architecture state registers 1201a are replicated in architecture state registers 1201b, so individual architecture states/contexts are capable of being stored for logical processor 1201a and logical processor 1201b. In core 1201, other smaller resources, such as instruction pointers and renaming logic in allocator and renamer block 1230 may also be replicated for threads 1201a and 1201b. Some resources, such as re-order buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201a, 1201b, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201a and 1201b are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 1210 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
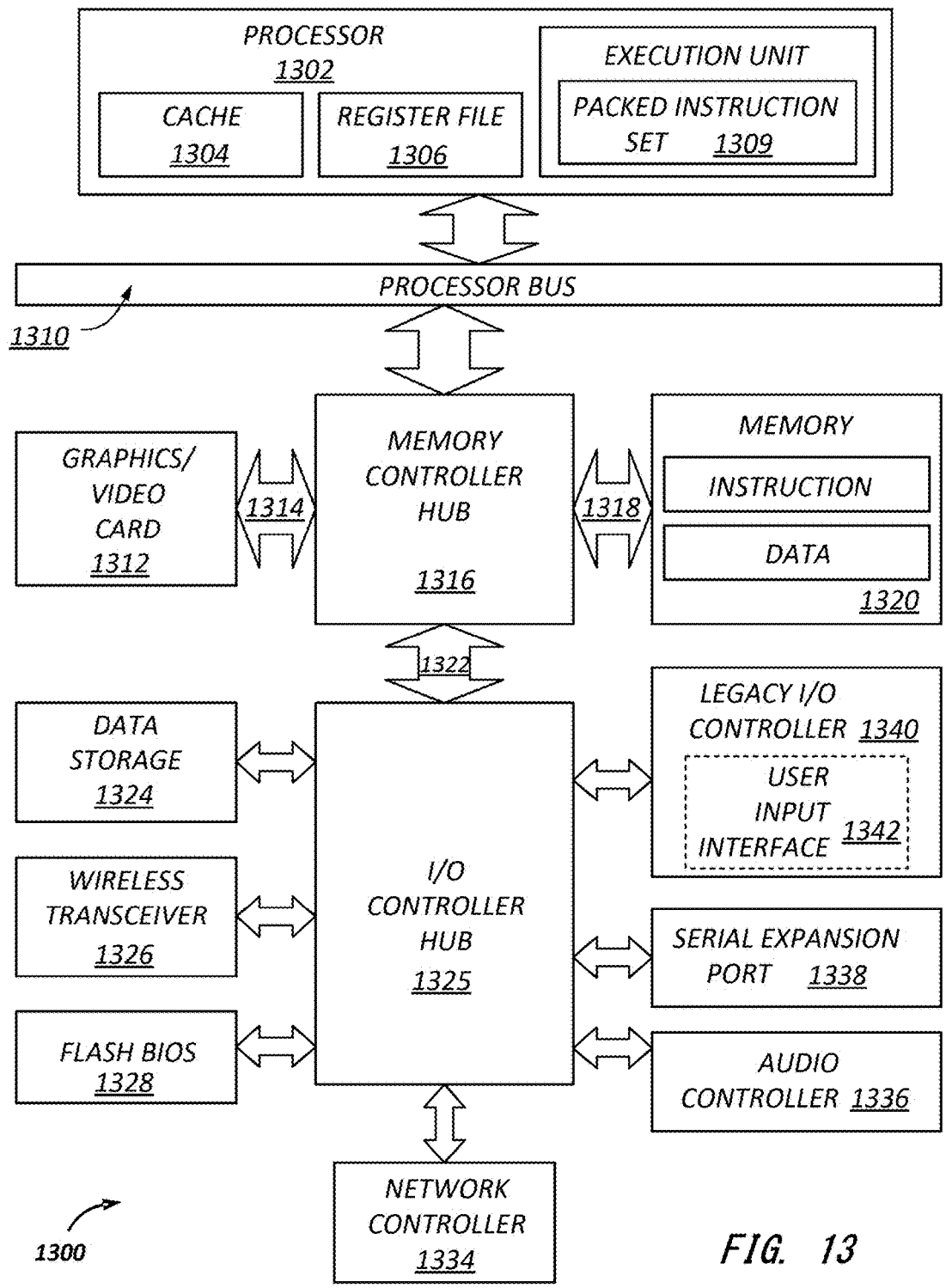
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present invention is illustrated. System 1300 includes a component, such as a processor 1302 to employ execution units including logic to perform algorithms for process data, in accordance with the present invention, such as in the embodiment described herein. System 1300 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the invention may be utilized on one or more interconnect illustrated in FIG. 13. For example, an on-die interconnect (ODI), which is not shown, for coupling internal units of processor 1302 implements one or more aspects of the invention described above. Or the invention is associated with a processor bus 1310 (e.g. other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
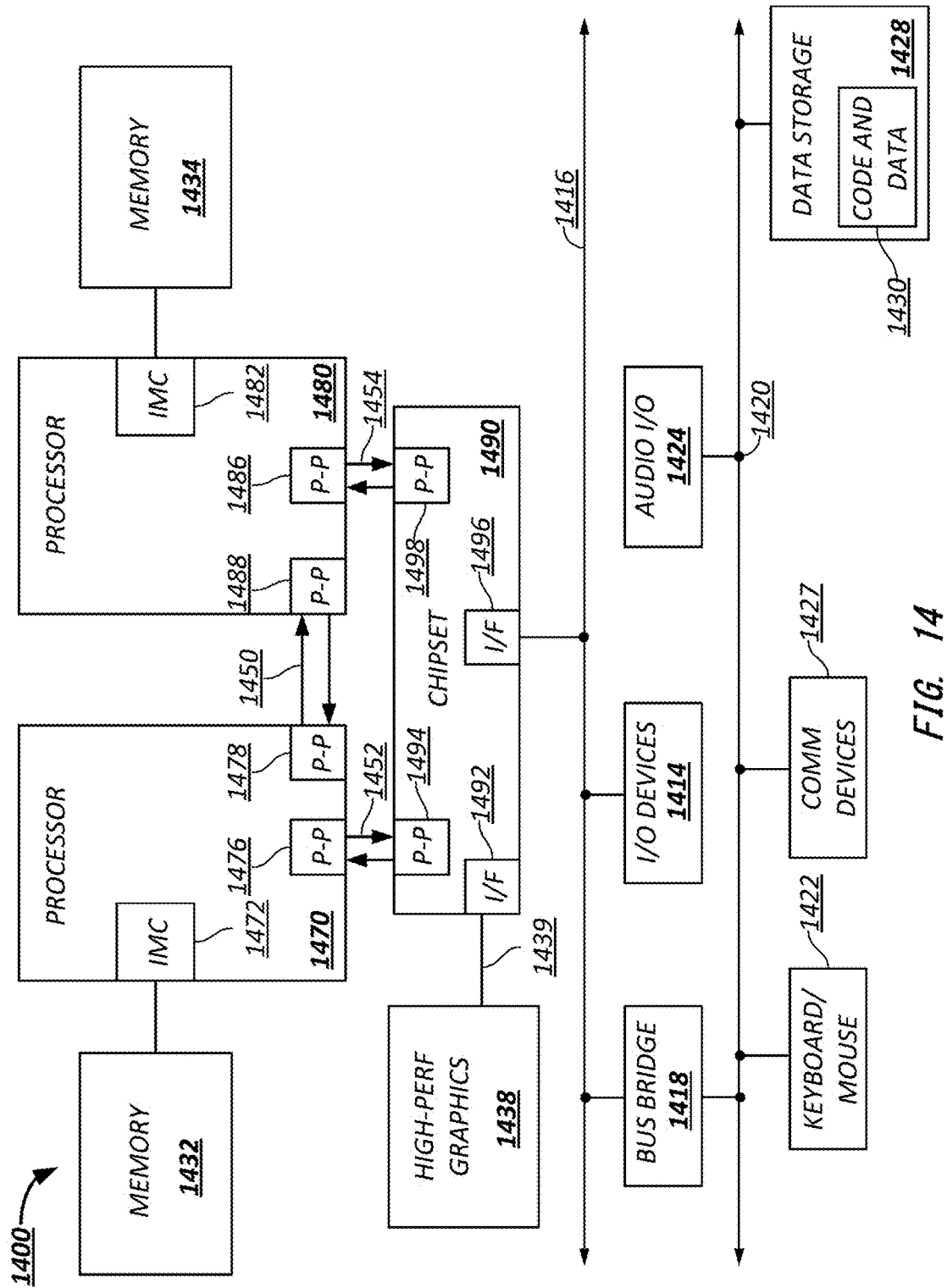
FIG. 14 illustrates an embodiment of a block for a computing system including multiple processor sockets.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide a method, an apparatus, a system, a machine readable storage, a machine readable medium, hardware- and/or software-based logic, where a receiver receives a signal, a boundary of which is to be sent in alignment with a sync counter value. A latency calculator determines nominal latency of a link based on the sync counter value, and a latency buffer applies additional latency to the signal to increase the nominal latency to a target latency for the link.

In at least one example, the signal is to be received in a polling link state.

In at least one example, state transition logic causes an exit from the polling link state to a compliance link state.

In at least one example, the state transition logic is to determine whether to transition from the polling link state to one of the compliance link state, a loopback state, a link width state, and a reset state.

In at least one example, the loopback state is to comprise a loopback marker state.

In at least one example, the compliance link state, the loopback marker state, the link width state, and the reset state are included in a plurality of states defined in a state machine and the plurality of state further comprise a loopback pattern state.

In at least one example, the state transition logic is to further exit from the compliance link state to one of a reset state and a loopback pattern state.

In at least one example, the sync counter is set to a planetary alignment signal of a system.

In at least one example, the signal is to comprise an electrical ordered set.

In at least one example, the electrical ordered set is to comprise an electric idle exit ordered set (EIEOS) and the signal is to comprise a supersequence, and the EIEOS is to repeat according to a defined frequency within the supersequence.

One or more embodiments may provide an apparatus, a system, a machine readable storage, a machine readable medium, hardware- and/or software-based logic, and a method to identify a target latency for a link, receive a supersequence defined to correspond to a particular one of a plurality of link states, a portion of the supersequence defined to be sent aligned with a sync counter value, determine a nominal latency of the link based on arrival of the supersequence and sync counter value, and determine whether to adjust the nominal latency to meet the target latency.

In at least one example, the target latency is to be identified in a received signal.

In at least one example, the signal is to comprise a training sequence and the training sequence is to include a header field to indicate the target latency.

In at least one example, the nominal latency is to be adjusted when the target latency is greater than the nominal latency and the difference between the nominal latency and the target latency is less than the depth of a latency buffer of the apparatus.

In at least one example, a determination that the nominal latency cannot be adjusted to meet the target latency is to cause an error is to be reported to software.

One or more embodiments may provide an apparatus, a system, a machine readable storage, a machine readable medium, hardware- and/or software-based logic, and a method to identify a latency fixing error detected by a device corresponding to an inability to adjust a nominal latency detected on a link to a defined target latency value, adjust the target latency value based on the latency fixing error, and provide the adjusted target latency value for use by the device in latency fixing.

In at least one example, the target latency value is to be communicated to the device in a header field of a training sequence included in a supersequence of a particular one of a plurality of link states defined in a state machine for the link.

In at least one example, the nominal latency is to be detected based on an arrival of a boundary of an electrical ordered set included in the supersequence, and the boundary is to be aligned with a sync counter rollover.

In at least one example, the error is based on insufficient latency buffer depth of the device and the target latency value is to be adjusted to decrease the target latency value.

In at least one example, the error is based on the nominal latency being larger than the target latency and the target latency value is to be adjusted to increase the target latency value.

One or more embodiments may provide a method, an apparatus, a system, a machine readable storage, a machine readable medium, hardware- and/or software-based logic, where a controller is provided to interface between at least a first processor to recognize a first instruction set and second processor to recognize a second instruction set that is different from the first instruction set. The controller can include interface logic to couple to a link comprising a plurality of lanes. The interface logic can fix latency of the link, by receiving a signal, the boundary of which is sent in alignment with a sync counter value, determining nominal latency of a link based on the sync counter value, and applying additional latency to the signal to increase the nominal latency to a target latency for the link.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a receiver to receive a signal, wherein a boundary of the signal is to be sent in alignment with a sync counter value;
   a latency calculator to determine nominal latency of a link based on the sync counter value; and
   a latency buffer to apply additional latency to the signal to increase the nominal latency to a target latency for the link; and
   buffer manager logic to detect whether the latency buffer is deep enough to provide the additional latency, wherein the buffer manager logic is to signal an error when insufficient depth is detected in the latency buffer to meet the target latency.

2. The apparatus of claim 1, wherein the signal is to be received in a polling link state.

3. The apparatus of claim 2, further comprising state transition logic to exit from the polling link state to a compliance link state.

4. The apparatus of claim 3, wherein the state transition logic is to determine whether to transition from the polling link state to one of the compliance link state, a loopback state, a link width state, and a reset state.

5. The apparatus of claim 4, wherein the loopback state is to comprise a loopback marker state.

6. The apparatus of claim 5, wherein the compliance link state, the loopback marker state, the link width state, and the reset state are included in a plurality of states defined in a state machine and the plurality of state further comprise a loopback pattern state.

7. The apparatus of claim 3, wherein the state transition logic is to further exit from the compliance link state to one of a reset state and a loopback pattern state.

8. The apparatus of claim 1, wherein the sync counter is set to a planetary alignment signal of a system.

9. The apparatus of claim 1, wherein the signal is to comprise an electrical ordered set.

10. The apparatus of claim 9, wherein the electrical ordered set is to comprise an electric idle exit ordered set (EIEOS) and the signal is to comprise a supersequence, and the EIEOS is to repeat according to a defined frequency within the supersequence.

11. An apparatus comprising:
    latency fixing logic to:
      identify a target latency for a link;
      receive a supersequence, wherein the supersequence is to be defined to correspond to a particular one of a plurality of link states and a portion of the supersequence is to be defined to be sent aligned with a sync counter value;
      determine a nominal latency of the link based on arrival of the supersequence and sync counter value; and
      determine whether to adjust the nominal latency to meet the target latency, wherein the nominal latency is to be adjusted when the target latency is greater than the nominal latency and the difference between the nominal latency and the target latency is less than the depth of a latency buffer of the apparatus, and a determination that the nominal latency cannot be adjusted to meet the target latency is to cause an error to be reported to software.

12. The apparatus of claim 11, wherein the target latency is to be identified in a received signal.

13. The apparatus of claim 12, wherein the signal is to comprise a training sequence and the training sequence is to include a header field to indicate the target latency.

14. An apparatus comprising:
a controller to interface between at least a first processor to recognize a first instruction set and second processor to recognize a second instruction set that is different from the first instruction set, the controller comprising interface logic to couple to a link comprising a plurality of lanes; and
the interface logic to fix latency of the link, wherein the interface logic is to:
receive a signal, wherein a boundary of the signal is to be sent in alignment with a sync counter value;
determine nominal latency of a link based on the sync counter value; and
apply additional latency to the signal to increase the nominal latency to a target latency for the link using a latency buffer; and
buffer management logic to detect whether the latency buffer is deep enough to provide the additional latency, wherein the buffer manager logic is to signal an error when insufficient depth is detected in the latency buffer to meet the target latency.

* * * * *